United States Patent
Oh et al.

(10) Patent No.: US 11,276,874 B2
(45) Date of Patent: Mar. 15, 2022

(54) RECHARGEABLE BATTERY WITH VARIABLE LAYER DEPENDENT TO TEMPERATURE CHANGE

(71) Applicant: Samsung Electronics Co., Ltd., Gyeonggi-do (KR)

(72) Inventors: Bookeun Oh, Gyeonggi-do (KR); Yeonil Lee, Seoul (KR); Jaeyeon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 523 days.

(21) Appl. No.: 15/922,479

(22) Filed: Mar. 15, 2018

(65) Prior Publication Data
US 2018/0269517 A1 Sep. 20, 2018

(30) Foreign Application Priority Data
Mar. 15, 2017 (KR) .................. 10-2017-0032341

(51) Int. Cl.
*H01M 10/04* (2006.01)
*H01M 10/60* (2014.01)
(Continued)

(52) U.S. Cl.
CPC ......... *H01M 10/0431* (2013.01); *H01M 4/13* (2013.01); *H01M 4/661* (2013.01);
(Continued)

(58) Field of Classification Search
None
See application file for complete search history.

(56) References Cited

U.S. PATENT DOCUMENTS 9,203,109 B2 12/2015 Hu et al.
2010/0255353 A1 10/2010 McDonald et al.
(Continued)

FOREIGN PATENT DOCUMENTS

JP 2011-048932 3/2011
JP 2014-146497 8/2014
(Continued)

OTHER PUBLICATIONS

International Search Report dated Jul. 9, 2018 issued in counterpart application No. PCT/KR2018/003041, 10 pages.
(Continued)

*Primary Examiner* — Jonathan Crepeau
*Assistant Examiner* — Angela J Martin
(74) *Attorney, Agent, or Firm* — The Farrell Law Firm, P.C.

(57) ABSTRACT

A rechargeable battery is provided. The rechargeable battery includes a positive electrode substrate layer; a positive electrode active material layer disposed adjacent to the positive electrode substrate layer; a negative electrode substrate layer; a negative electrode active material layer disposed adjacent to the negative electrode substrate layer; a separator disposed between the positive electrode active material layer and the negative electrode active material layer; and a shape variable layer disposed between the positive electrode substrate and the positive electrode active material layer or between the negative electrode substrate and the negative electrode active material layer.

12 Claims, 42 Drawing Sheets

(51) Int. Cl.
  *H01M 4/13*     (2010.01)
  *H01M 4/66*     (2006.01)
  *H01M 10/42*    (2006.01)
  *H04M 1/02*     (2006.01)
  *H01M 50/581*   (2021.01)
  *H02J 7/00*     (2006.01)
  *H01M 10/058*   (2010.01)
  *H01M 10/052*   (2010.01)
  *H01M 10/0587*  (2010.01)
  *H01M 50/209*   (2021.01)

(52) U.S. Cl.
  CPC ........... *H01M 4/667* (2013.01); *H01M 4/668* (2013.01); *H01M 10/4235* (2013.01); *H01M 10/60* (2015.04); *H01M 50/581* (2021.01); *H04M 1/0262* (2013.01); *H01M 10/052* (2013.01); *H01M 10/058* (2013.01); *H01M 10/0587* (2013.01); *H01M 50/209* (2021.01); *H01M 2200/10* (2013.01); *H02J 7/007* (2013.01)

(56) References Cited

U.S. PATENT DOCUMENTS

| | | |
|---|---|---|
| 2012/0308889 A1 | 12/2012 | Chung |
| 2013/0209889 A1* | 8/2013 | Takahata ............... H01M 4/668 429/231.1 |
| 2013/0236766 A1* | 9/2013 | Seo ....................... H01M 2/145 429/144 |
| 2014/0069578 A1 | 3/2014 | Xie et al. |
| 2015/0125757 A1* | 5/2015 | Kato ..................... H01M 4/661 429/245 |
| 2016/0126535 A1* | 5/2016 | Qiao ..................... B60L 50/60 429/61 |
| 2017/0309970 A1 | 10/2017 | Kim et al. |

FOREIGN PATENT DOCUMENTS

| | | | | |
|---|---|---|---|---|
| JP | 2014146497 | * | 8/2014 | |
| KR | 10-0475989 | | 3/2005 | |
| KR | 101191626 | | 10/2012 | |
| KR | 10-1246825 | * | 3/2013 | ............. H01M 2/16 |
| KR | 10-1470070 | | 12/2014 | |
| KR | 1020160058566 | | 5/2016 | |
| KR | 20160073298 | | 6/2016 | |
| KR | 1020160115419 | | 10/2016 | |
| WO | WO 2016/099038 | | 6/2016 | |

OTHER PUBLICATIONS

European Search Report dated Jun. 19, 2020 issued in counterpart application No. 18768304.0-1108, 18 pages.
European Search Report dated Feb. 25, 2020 issued in counterpart application No. 18768304.0-1108, 15 pages.

* cited by examiner

US 11,276,874 B2

RECHARGEABLE BATTERY WITH VARIABLE LAYER DEPENDENT TO TEMPERATURE CHANGE

CROSS-REFERENCE TO RELATED APPLICATION(S)

This application is based on and claims priority under 35 U.S.C. § 119 to Korean Patent Application No. 10-2017-0032341, filed on Mar. 15, 2017, in the Korean Intellectual Property Office, the disclosure of which is incorporated by reference herein in its entirety.

BACKGROUND

1. Field

The present disclosure relates generally to a rechargeable battery and, more particularly, to a rechargeable battery including a variable layer depending on a temperature change.

2. Description of the Related Art

A secondary cell of a portable electronic device such as a smart phone may be classified into a cylindrical cell in which an electrode assembly is embedded in a cylindrical metal can, a rectangular cell in which an electrode assembly is embedded in a rectangular metal can, and a pouch-type cell in which an electrode assembly is embedded in a pouch-type case of an aluminum laminate sheet, according to a shape of a cell case.

A battery electrode assembly may be classified into a jellyroll type (a wound type) and a stacked type (a laminated type). The jellyroll-type electrode assembly may be manufactured by coating an electrode active material or the like on a metal foil used as a current collector, followed by forming an electrode through a pressing and slitting process, and by separating a negative electrode and a positive electrode by the use of a separator, followed by winding it in a spiral shape.

The stacked-type electrode assembly has a structure in which a plurality of positive and negative electrode units separated by a separator are sequentially stacked, and may be applicable to both rectangular and pouch-type cells. In addition, an electrode assembly which is a mixed type of the jelly-roll type and the stack type may be used.

When a temperature of a rechargeable battery increases due to a variety of internal and external thermal causes, for example, when it is pierced by a sharp needle-shaped conductor having electrical conductivity such as a nail, a positive electrode and a negative electrode are electrically connected by the needle-shaped connector. Thus, current flows to the needle-shaped conductor having low resistance. In this case, a high resistance heat is generated due to current flowing through a contact resistance portion between a positive electrode active material/substrate and a negative electrode active material/substrate.

When the temperature of the rechargeable battery increases to be greater than or equal to a threshold due to the aforementioned heat, a direct contact occurs between the positive electrode and the negative electrode since the separator has shrunk. As a result, a thermal runaway phenomenon occurs, which acts as a major cause of overheating, ignition, or explosion of the rechargeable battery.

In addition, when metal foreign matter is incorporated due to poor battery cell manufacturing or the like, the rechargeable battery is not normally insulated between a positive electrode and a negative electrode, which causes an internal short circuit. In this case, there may be a problem in that a localized portion is heated. The battery does not have a function of blocking the heating of the localized portion, which may lead to a serious problem in that an ignition phenomenon may occur due to a thermal runaway process.

SUMMARY

An aspect of the present disclosure provides a rechargeable battery having a structure which blocks an overheating phenomenon of a battery.

Another aspect of the present disclosure provides a rechargeable battery capable of blocking an overheating phenomenon by separating or detaching a positive or negative electrode active material from an electrode substrate by the use of a shape variable layer of which a shape changes depending on a temperature.

Another aspect of the present disclosure provides a rechargeable battery capable of blocking an overheating phenomenon by separating or detaching a positive or negative electrode active material from an electrode substrate by the use of a temperature control layer of which a resistance characteristic changes depending on a temperature.

Another aspect of the present disclosure provides a rechargeable battery having a structure which blocks a localized overheating phenomenon of a battery electrode assembly.

Another aspect of the present disclosure prevents an overheating phenomenon (or a thermal runaway or ignition phenomenon) of a battery, thereby providing a reliable rechargeable battery.

In accordance with an embodiment, a rechargeable battery is provided. The rechargeable battery includes a positive electrode substrate layer; a positive electrode active material layer disposed adjacent to the positive electrode substrate layer; a negative electrode substrate layer; a negative electrode active material layer disposed adjacent to the negative electrode substrate layer; a separator disposed between the positive electrode active material layer and the negative electrode active material layer; and a shape variable layer disposed between the positive electrode substrate and the positive electrode active material layer or between the negative electrode substrate and the negative electrode active material layer.

In accordance with another embodiment, a rechargeable battery is provided. The rechargeable battery includes an electrode layer; an electrode active material layer corresponding to the electrode layer; and a shape variable layer disposed between the electrode layer and the electrode active material layer to regulate current between the electrode layer and the electrode active material layer at a temperature greater than or equal to a pre-determined temperature.

According to another embodiment, a rechargeable battery is provided. The rechargeable battery includes an electrode layer; an electrode active material layer corresponding to the electrode layer; and a shape variable layer disposed between the electrode layer and the electrode layer active material layer to regulate current between the electrode layer and the electrode active material layer, depending on a temperature.

BRIEF DESCRIPTION OF THE DRAWINGS

The above and other aspects, features, and advantages of embodiments of the present disclosure will be more apparent from the following detailed description, taken in conjunction with the accompanying drawings, in which.

DETAILED DESCRIPTION

Figure 1:
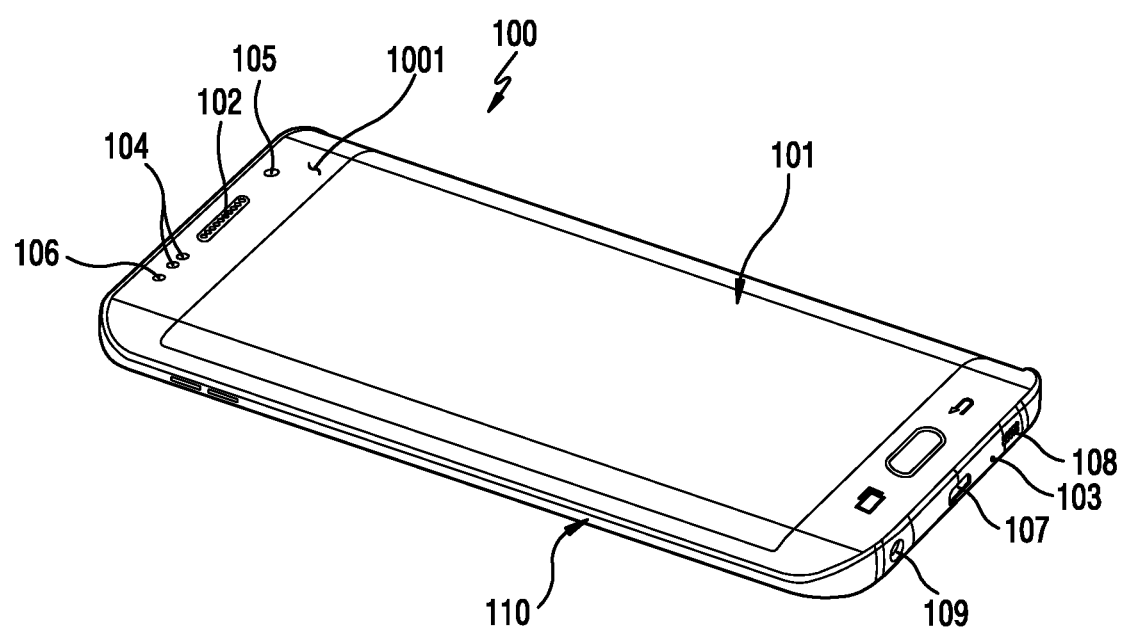
FIG. 1 is a front perspective view of an electronic device according to an embodiment.

Hereinafter, various embodiments of the present disclosure are described below with reference to the accompanying drawings. However, the present disclosure is not intended to be limited to certain embodiments, and it should be understood that modification, equivalent, and/or alternative on the various embodiments described herein may be variously made. With regard to the description of the accompanying drawings, similar components may be marked by similar reference numerals.

In the present disclosure, the expressions "have," "may have," "include," "comprise," "may include," and "may comprise" indicate the existence of corresponding features (for example, elements such as numeric values, functions, operations, or components) but do not preclude the presence of additional features.

In the present disclosure, the expressions "A or B," "at least one of A and/or B," "one or more of A and/or B," and the like may include any and all combinations of one or more of the associated listed items. For example, the terms "A or B," "at least one of A and B," and "at least one of A or B" may refer to all of the case (1) where at least one A is included, the case (2) where at least one B is included, and the case (3) where both of at least one A and at least one B are included.

The terms, such as "first," "second," and the like used herein, may refer to various elements of various embodiments of the present disclosure, but are not intended to limit the present disclosure. For example, such terms are not intended to limit the order and/or priority of the elements. Furthermore, such terms may be used to distinguish one element from another element. For example, "a first user device" and "a second user device" indicate different user devices regardless of the order or priority. For example, without departing from the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), the element may be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used instead of, for example, the expressions "suitable for," "having the capacity to," "designed to," "adapted to," "made to," and "capable of". The term "configured to (or set to)" does not indicate only "specifically designed to" in hardware. Instead, the expression "a device configured to" may indicate that the device is "capable of" operating together with another device or other components. For example, a "processor configured to (or set to) perform A, B, and C" may indicate a dedicated processor (for example, an embedded processor) for performing a corresponding operation or a general-purpose processor (for example, a central processing unit (CPU) or an application processor (AP)) which may perform corresponding operations by executing one or more software programs which are stored in a memory device.

Terms used in the present disclosure are used to describe certain embodiments of the present disclosure but are not intended to limit the scope of the present disclosure. The terms of a singular form may include plural forms unless otherwise specified. Unless otherwise defined herein, all the terms used herein, may have the same meanings that are generally understood by a person skilled in the art. It will be further understood that terms, which are defined in a dictionary and commonly used, should also be interpreted as is customary in the relevant related art but not in an idealized or overly formal way, unless expressly so defined herein in various embodiments of the present disclosure. In some cases, even if terms are defined in the specification, they are not intended to be interpreted to exclude embodiments of the present disclosure.

An electronic device according to various embodiments may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, or wearable devices (for example, smart glasses, head-mounted-devices (HMDs), electronic apparels, electronic bracelets, electronic necklaces, electronic appcessory, electronic tattoos, smart mirrors, or smart watches).

According to an embodiment, the electronic devices may be smart home appliances. The smart home appliances may include at least one of, for example, televisions (TVs), digital video disk (DVD) players, audio players, refrigerators, air conditioners, cleaners, ovens, microwave ovens, washing machines, air cleaners, set-top boxes, home automation control panels, security control panels, TV boxes (for example, Samsung HomeSync®, Apple TV®, or Google TV™), game consoles (for example, Xbox® and PlayStation™®), electronic dictionaries, electronic keys, camcorders, electronic picture frames, and the like.

According to an embodiment, the electronic devices may include at least one of medical devices (for example, various portable medical measurement devices (for example, a blood glucose monitoring device, a heartbeat measuring device, a blood pressure measuring device, a thermometer, and the like), a magnetic resonance angiography (MRA) device, a magnetic resonance imaging (MRI) device, a computed tomography (CT) device, scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automated teller machines (ATMs), points of sales (POSs) devices of stores, or Internet of things (IoT) devices (for example, light bulbs, various sensors, electric or gas meters, sprinkler devices, fire alarms, thermostats, street lamps, toasters, exercise equipment, hot water tanks, heaters, boilers, and the like).

According to an embodiment, the electronic devices may include at least one of a part of furniture or buildings/structures, electronic boards, electronic signature receiving devices, projectors, or various measuring instruments (for example, water meters, electricity meters, gas meters, or wave meters, and the like). The electronic devices may be one or more combinations of the above-mentioned devices. An electronic device may be a flexible electronic device. However, electronic devices are not intended to be limited to the above-mentioned devices, but may include newly developed electronic devices.

Figure 2:
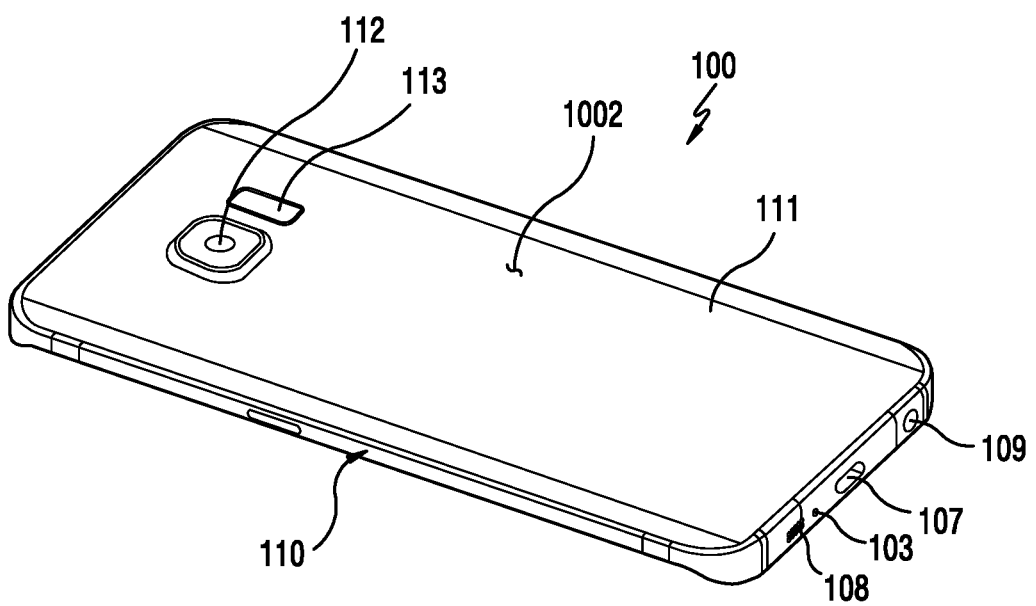
FIG. 2 is a rear perspective view of an electronic device according to an embodiment.

FIG. 1 is a front perspective view of an electronic device according to an embodiment. FIG. 2 is a rear perspective view of an electronic device according to an embodiment.

Referring to FIGS. 1 and 2, an electronic device 100 may include a display 101 disposed to a first surface 1001 (e.g., a front surface). The display 101 may include a touch sensor to operate as a screen device. The display 101 may include a pressure sensor to operate as a pressure responsive screen device.

According to an embodiment, the electronic device 100 may include a receiver 102 disposed to output voice of a peer user. The electronic device 100 may include a microphone device 103 disposed to transmit a voice of a user to the peer user.

According to an embodiment, the electronic device 100 may have components for performing various functions of the electronic device 100 at a surrounding area where the receiver 102 is installed. The components may include at least one sensor module 104. The sensor module 104 may include, for example, at least one of an illumination sensor (e.g., an optical sensor), a proximity sensor (e.g., an optical sensor), an infrared sensor, and an ultrasonic sensor. The component may include a front camera device 105. The component may include an indicator 106 (e.g., a light emitting diode (LED) device) for informing the user of status information of the electronic device 100.

According to an embodiment, the electronic device 100 may include a speaker device 108 disposed to one side of the microphone device 103. The electronic device 100 may include a connector port 107 disposed to the other side of the microphone device 103 to perform a data transmission/reception function with respect to an external device and to charge the electronic device 100 by using external power supplied thereto. The electronic device 100 may include an ear jack hole 109 disposed to one side of the connector port 107.

According to an embodiment, the electronic device 100 may include a housing 110. The housing 110 may be formed of a conductive member and a non-conductive member. The housing 110 may be disposed along a boundary of the electronic device 100, and may be disposed by being extended to up to at least a sub-area of a front surface or rear surface. The housing 110 may define at least a portion of a thickness of the electronic device 100 along the boundary of the electronic device 100. However, without being limited thereto, the housing 110 may also be disposed to at least the portion of the thickness of the electronic device 100. At least a portion of the housing 110 may be embedded inside the electronic device 100.

According to an embodiment, the electronic device 100 may include a rear window 111 disposed to a second surface 1002 (e.g., a rear surface) facing the first surface 1001. The electronic device 100 may include a rear camera device 112 disposed through the rear window 111. The electronic device 100 may include at least one electronic component 113 disposed to one side of the rear camera device 112. The electronic component 113 may include at least one of an illumination sensor (e.g., an optical sensor), a proximity sensor (e.g., an optical sensor), an infrared sensor, an ultrasonic sensor, a heart rate sensor, a flash device, and a fingerprint recognition sensor.

According to an embodiment, the electronic device 100 may include a rechargeable battery fixed to the housing 110 inside the electronic device 100 as a power supply means. The rechargeable battery may include a pouch-type battery.

Figure 3:
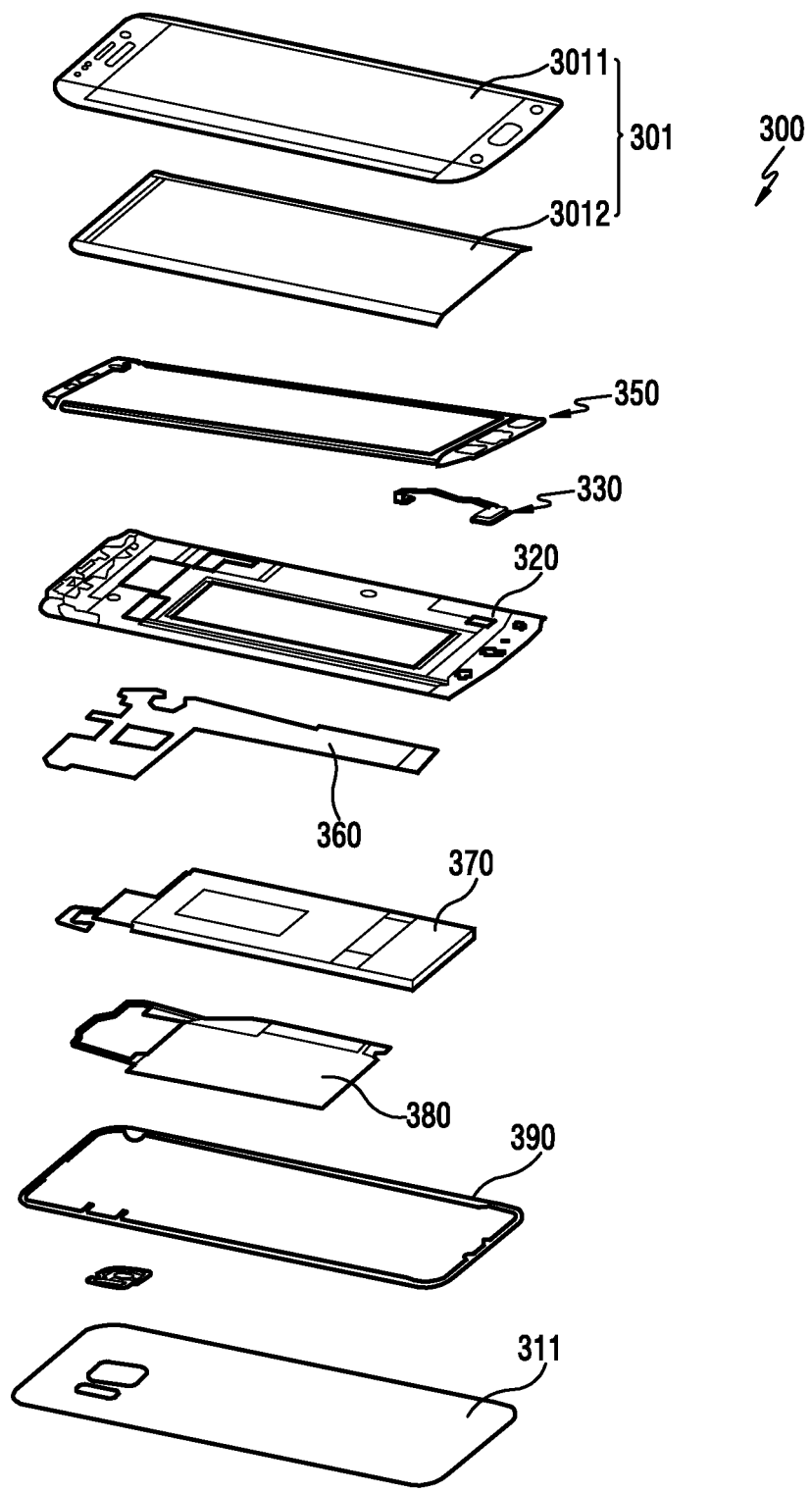
FIG. 3 is an exploded perspective view of an overall structure of an electronic device according to an embodiment.

FIG. 3 is an exploded perspective view of an electronic device 300 according to an embodiment.

The electronic device 300 may be similar to the electronic device 100 of FIGS. 1 and 2, or may include another embodiment.

Referring to FIG. 3, the electronic device 300 may include a key input device 330, at least one seal member 350, and a display 301 including a display module 3012 and a window 3011, which are disposed sequentially at an upper side of a housing 320. The electronic device 300 may include a printed circuit board (PCB) 360, a flexible PCB (FPCB), a main board, etc.), a rechargeable battery 370, a wireless power transmission/reception member 380, a rear seal member 390, and a rear window 311. The rechargeable battery 370 may be accommodated in an accommodating space provided in the housing 320, and may be disposed by avoiding the printed circuit board 360. The rechargeable battery 370 and the PCB 360 may be disposed in a parallel manner not to overlap with each other. However, without being limited thereto, at least a sub-area of the rechargeable battery 370 may be disposed to overlap with the printed circuit board 360.

According to an embodiment, although the housing 320 may be used alone in an embodiment, at least one plate (e.g., a central plate, a rear plate, a detachable battery cover, etc.) coupled to the housing 320 may also be used together. The housing 320 may be formed by using a conductive member (e.g., a metal member, etc.) and a non-conductive member (e.g., resin, etc.). The housing 320 may be formed of a conductive member and a non-conductive member through an insert injection process or a double injection process.

According to an embodiment, the display 301 may be applied to the housing 320 after the display module 3012 is attached to a rear surface of the window 3011. The window 3011 may be formed of a transparent material such as glass, resin, or the like. The display module 3012 may include a touch sensor. The display module 3012 may include a touch sensor and a force sensor. The electronic device 300 may include at least one seal member 350 disposed between the housing 320 and the display 301 for the purpose of waterproofing.

According to an embodiment, the electronic device 300 may include the seal member 390 disposed between a rear surface of the housing 320 and the rear window 311 along a boundary thereof for the purpose of waterproofing. The rear window 311 may be formed of at least one material among glass, plastic, synthetic resin, and metal. The seal members 350 and 390 may include at least one of tapes, adhesive agents, waterproof dispensing, silicon, waterproof rubber, and urethane.

According to an embodiment, the PCB 360 may include a memory, a processor, various sensors, an input/output terminal, or the like, and may perform various functions of the electronic device 300 by using power supplied from the rechargeable battery 370. The PCB 360 may be disposed adjacent to the rechargeable battery 370. The PCB 360 may be disposed in such a manner that at least one surface thereof is in contact with one surface of the rechargeable battery 370 and thus at least one part thereof overlaps with the rechargeable battery 370, or may be disposed in such a manner that the same plane is occupied in a divided manner with respect to the rechargeable battery 370 by being configured in a shape of '¬' or '⊏' which avoids a space for arranging the rechargeable battery 370.

According to an embodiment, the rechargeable battery 370 may provide power to primary components such as the display 301, the printed circuit board 360, and the like, and may provide a mounting plane such as the wireless power transmission/reception member 380, various sheet-type sensors, or the like. The rechargeable battery 370 may be disposed in a battery placement area in which a certain space is ensured due to a mounting cavity space, a guide rib, and the like prepared in a sub-area of the housing 320 to provide reliable assembling and to avoid movement during use due to its volume and weight. The rechargeable battery 370 may be used as a built-in battery (e.g., a built-in battery packet) embedded in the electronic device 300, or may be detached from the electronic device 300 by a user for the purpose of replacement when the battery cover is open.

According to an embodiment, the rechargeable battery 370 may include a battery pouch in which a battery cell is supported, a protective circuit module (PCM) (e.g., a circuit board) to which a terminal pulled out from the battery pouch is electrically connected, and a case (e.g., a PCM housing or a PCM case) for protecting the PCM. The case in which the PCM is accommodated may be fixed to the battery pouch in an assembly structure for improving impact resistance, and thus elements (e.g., a battery pouch, a PCM, a terminal, etc.)

of the rechargeable battery 370 may be protected from damage even if an external impact is applied to the electronic device 300.

Figure 4A:
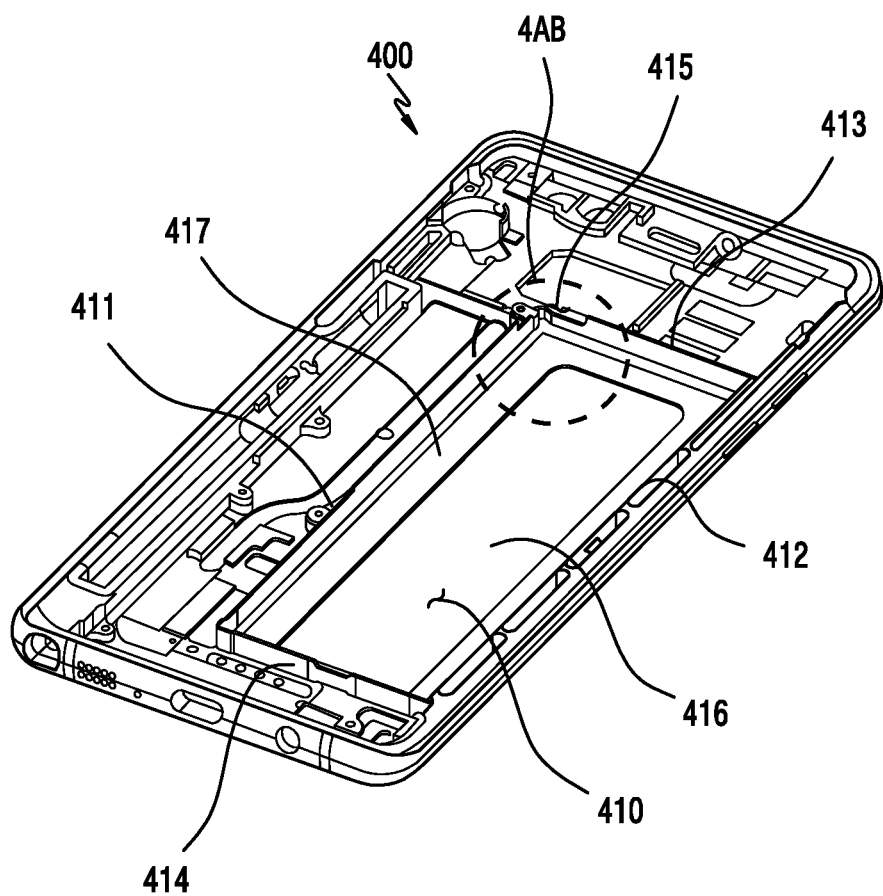
FIGS. 4AA and 4AB are a perspective view of a housing of an electronic device to which a rechargeable battery is applied and detail thereof according to an embodiment.
Figure 4A:
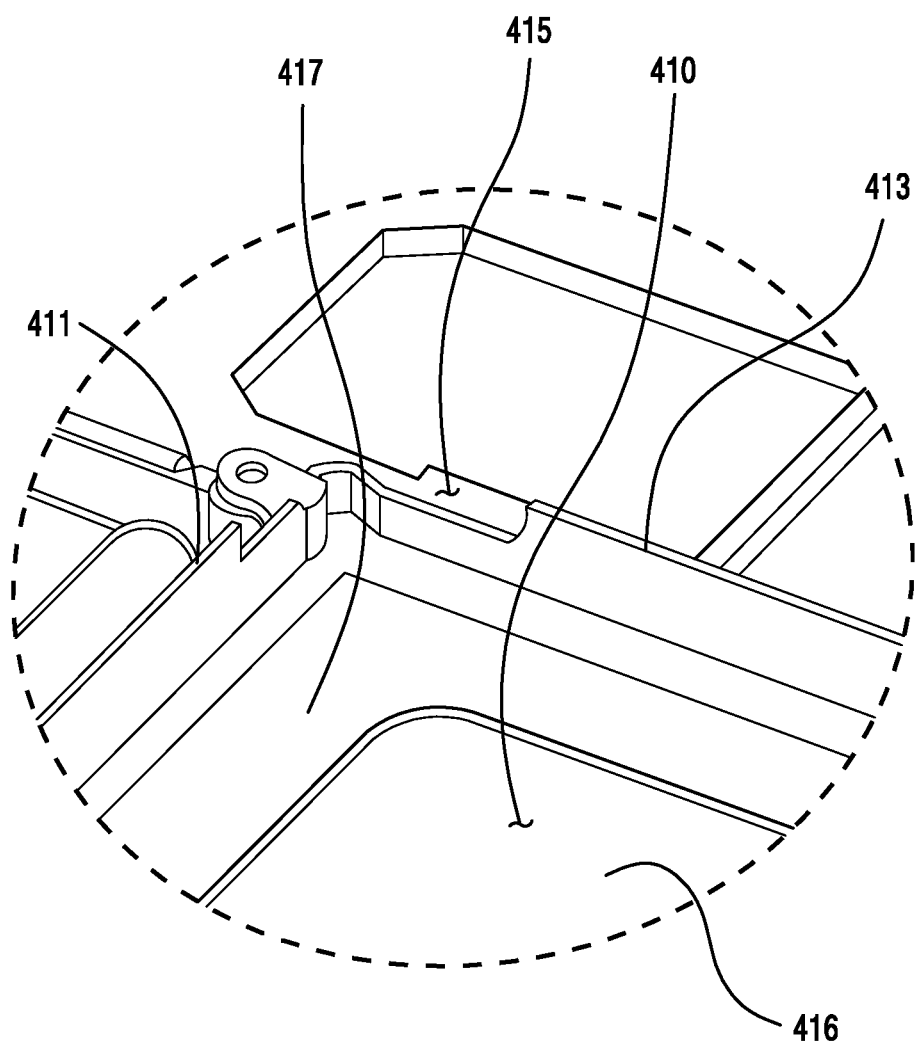
Figure 4B:
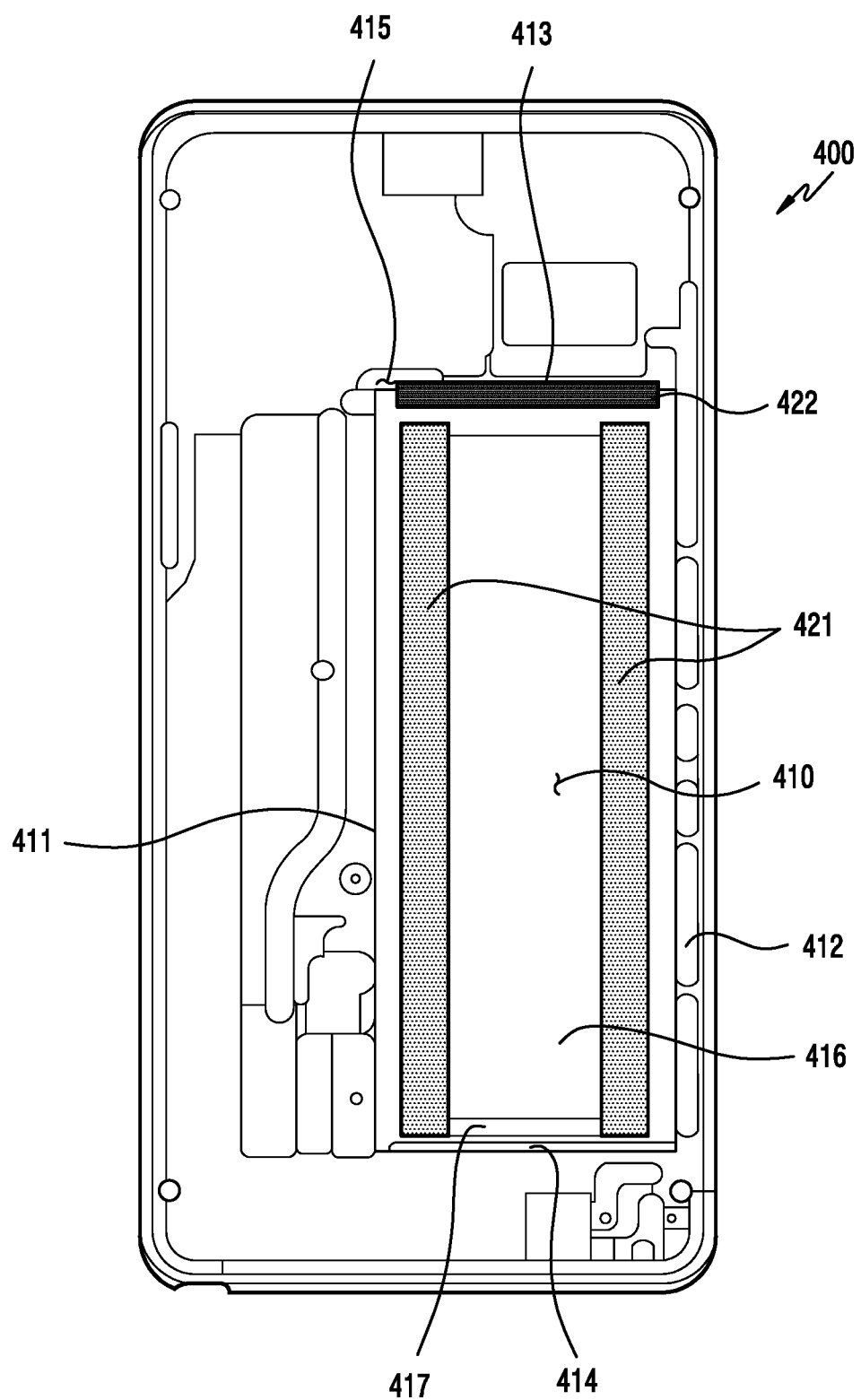
FIG. 4B is a plan view of a housing of an electronic device to which a rechargeable battery is applied according to an embodiment.
Figure 4C:
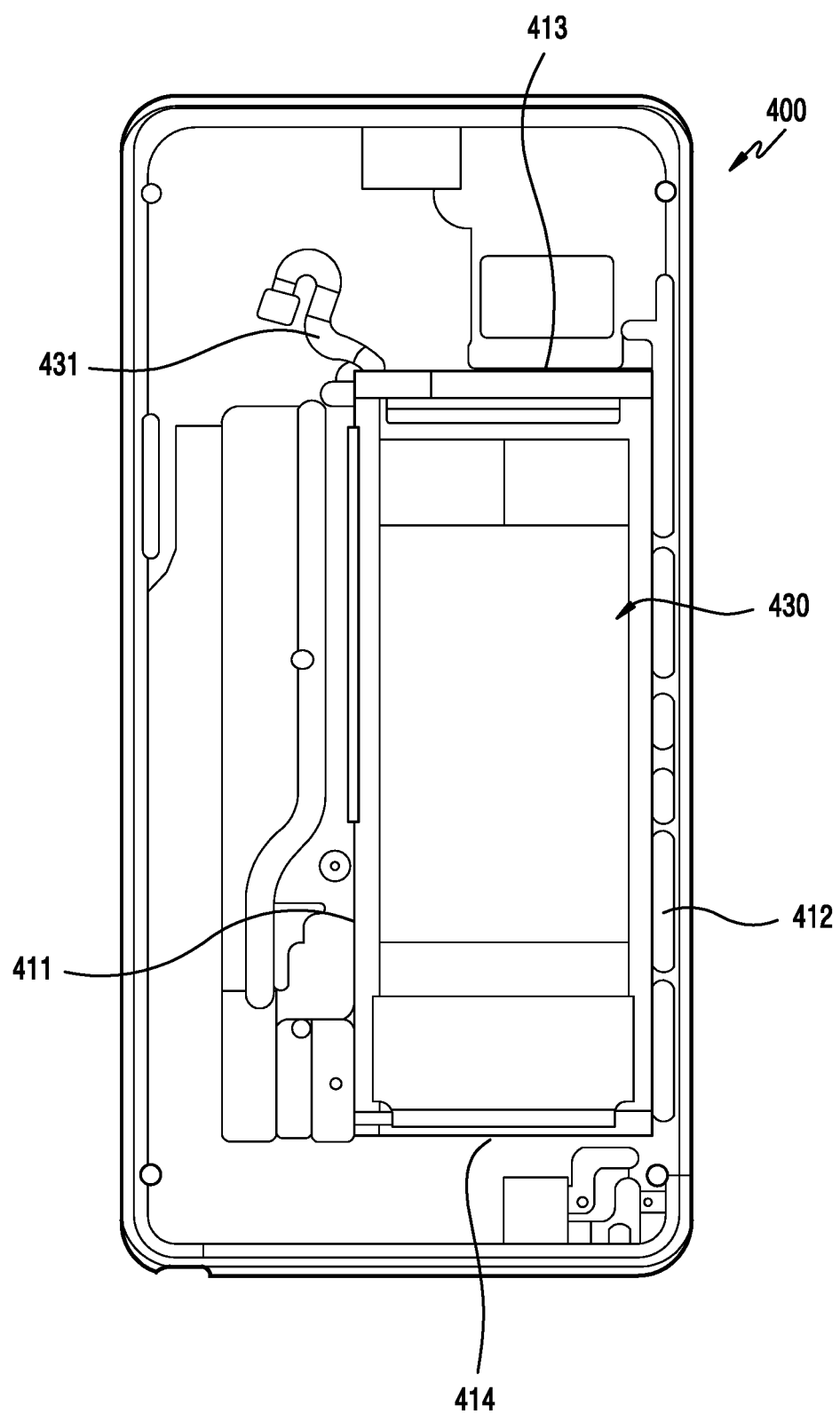
FIG. 4C is an illustration of a state where a rechargeable battery is placed in a housing of an electronic device according to an embodiment.

FIGS. 4AA and 4AB are a perspective view of a housing 400 of an electronic device to which a rechargeable battery is applied and details thereof according to an embodiment of the present disclosure. FIG. 4B is a plan view of the housing 400 of the electronic device to which a rechargeable battery is applied according to an embodiment of the present disclosure. FIG. 4C is an illustration of a state where a rechargeable battery is placed to the housing 400 of the electronic device according to an embodiment of the present disclosure.

The housing 400 may be similar to the housing 110 of FIGS. 1 and 2, the housing 320 of FIG. 3, or may include another embodiment.

Referring to FIGS. 4AA and 4AB, the housing 400 may be formed of a conductive member and a non-conductive member. According to an embodiment, if the housing 400 is formed of the conductive member and the non-conductive member, it may be formed by a double injection process, an insert injection process, or a computer numerical control (CNC)-based process. The housing 400 may include a placement portion 410 for accommodating a rechargeable battery (e.g., the rechargeable battery 430 of FIG. 4C). The placement portion 410 may be formed substantially in a shape of a mounting portion to which the battery is mountable. The placement portion 410 may include a first guide rib 411, a second guide rib 412 formed to face the first guide rib 411 in a spaced apart manner, a third guide rib 413 for connecting one end of each of the first guide rib 411 and the second guide rib 412, and a fourth guide rib 414 for connecting the other end of each of the first guide rib 411 and the second guide rib 412. The first, second, third, and fourth guide ribs 411, 412, 413, and 414 may be formed to protrude with a certain height from a surface of the housing 400, and the placement portion 410 may accommodate at least a part of a thickness of a battery in a recess shape by means of each of the first, second, third, and fourth guide ribs 411, 412, 413, and 414. A protrusion amount of each of the first, second, third, and fourth guide ribs 411, 412, 413, and 414 may be formed in the range of 50-80% of a thickness of a battery pack, and the remaining protrusion parts of the rechargeable battery may be compensated (e.g., supported or sealed) by a construction (e.g., a central plate, a rear plate, a rear housing, a battery cover, etc.) assembled to the housing 400. However, without being limited thereto, the placement portion 410 may be formed in a shape of a gap formed with a certain depth in a surface of the housing, without a separate protruding guide rib.

According to an embodiment, at least one of the first, second, third, and fourth guide ribs 411, 412, 413, and 414 may be provided in such a manner that some or all areas thereof are visually transparent. The first, second, third, and fourth guide ribs 411, 412, 413, and 414 provided visually transparently may allow a mounting state where a rechargeable battery is mounted to the placement portion 410 to be confirmable when or after it is assembled. In this case, the first, second, third, and fourth guide ribs 411, 412, 413, and 414 extended inside the housing 400 may be formed with a heterogeneous transparent material different from the housing 400 through a double injection or insert injection process.

According to an embodiment, the placement portion 410 may include an opening 416 formed to cope with a swelling phenomenon of a rechargeable battery. However, without being limited thereto, a gap lower than the placement portion may be formed in the placement portion 410 to cope with the swelling phenomenon. The placement portion 410 may include a tape mounting portion 417 for fixing the rechargeable battery to the placement portion 410. The placement portion 410 may include an opening portion 415 so that an FPCB (e.g., the FPCB 431 of FIG. 4C) including a connector pulled out from the to-be-placed rechargeable battery is pulled out to a PCB in the vicinity thereof. The opening portion 415 may be formed naturally by excluding at least a sub-area from the aforementioned first, second, third, and fourth guide ribs 411, 412, 413, and 414.

Referring to FIG. 4B, a tape 421 (e.g., a double-sided tape, etc.) for fixing the rechargeable battery (e.g., the battery pack 430 of FIG. 4C) may be disposed to the tape mounting portion 417 of the placement portion 410. However, without being limited thereto, the tape 421 may be replaced with adhesive agents or adhesive resin. According to an embodiment, at least one supporting member 422 disposed to compensate (e.g., support or seal) a step-height area in the rechargeable battery may be included in the placement portion 410. The supporting member 422 may be replaced by using at least a sub-area of the tape mounting portion 417, and in this case, the supporting member 422 may perform an adhesive function such as a double-sided tape.

According to an embodiment, the supporting member 422 or the tape 421 may be formed of a visually transparent material. The supporting member 422 or tape formed of the transparent material may allow a mounting state where the rechargeable battery is mounted to the placement portion 410 to be confirmable when or after it is assembled. The supporting member 422 or the tape may be replaced through bonding based on the transparent material, dispensing, ultra violet (UV) illumination, or curling accompanied by natural drying.

Referring to FIG. 4C, the housing 400 may accommodate a rechargeable battery 430 in a state where a double-sided tape (e.g., the double-sided tape 421 of FIG. 4B) and a supporting member (e.g., the supporting member 422 of FIG. 4B) are disposed through a tape mounting portion (e.g., the tape mounting portion 417 of FIG. 4A). According to an embodiment, the double-sided tape and the supporting member may be placed to the placement portion 410 of the housing 400 in a state of being attached to a corresponding outer surface of the battery pack 430 instead of the tape mounting portion 417. If the rechargeable battery 430 is placed to the placement portion 410, an FPCB 431 of the rechargeable battery 430 may be pulled out to the outside of the placement portion 410 through an opening portion (e.g., the opening portion 415 of FIG. 4A), and may be electrically connected to a printed circuit board in the vicinity thereof.

Figure 5:
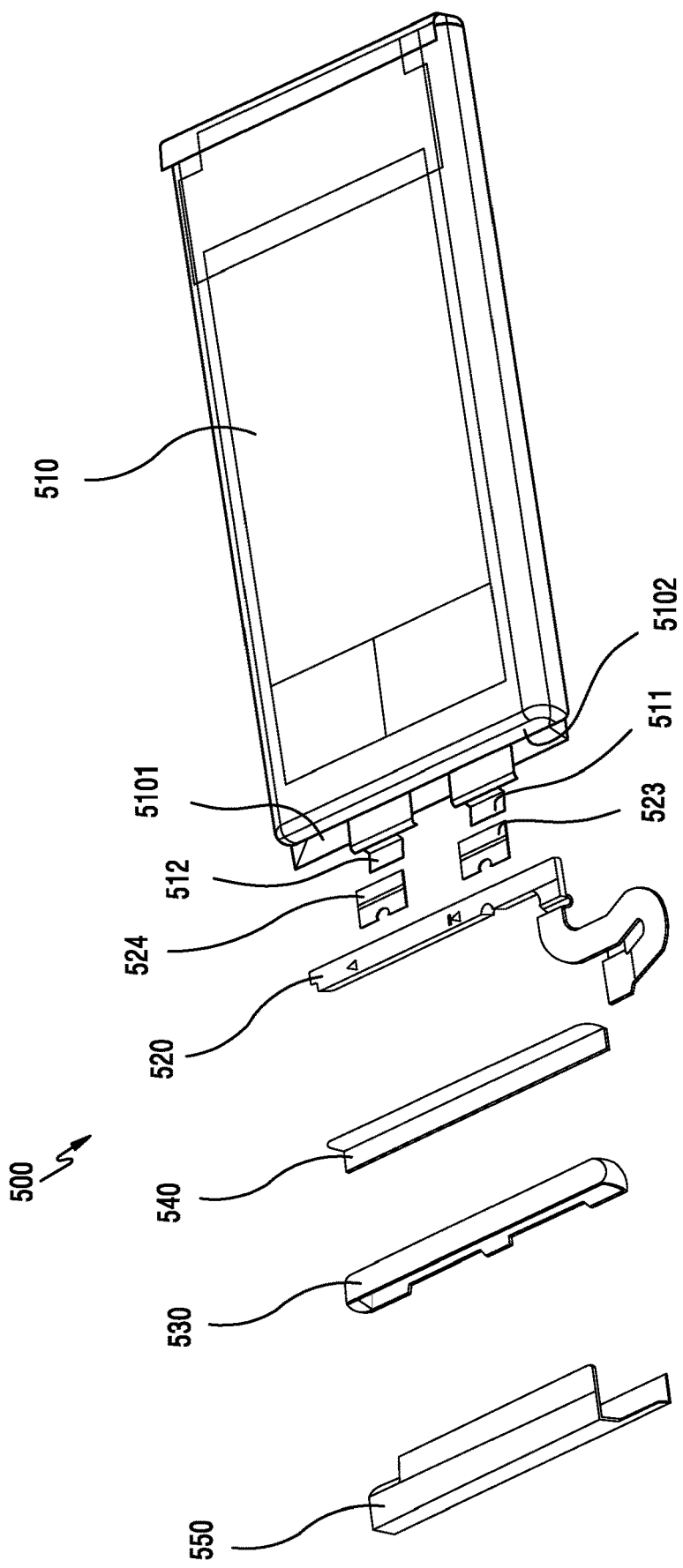
FIG. 5 is an exploded perspective view of a rechargeable battery according to an embodiment.

FIG. 5 is an exploded perspective view of a rechargeable battery 500 according to an embodiment.

The rechargeable battery 500 of FIG. 5 may be similar to the rechargeable battery 370 of FIG. 3, the rechargeable battery 430 of FIG. 4C, or may include another embodiment.

Referring to FIG. 5, the rechargeable battery 500 may include a battery pouch 510 including a battery cell (a battery cell 600 of FIG. 6A or a battery cell 700 of FIG. 7A described below in greater detail), a PCM 520 electrically connected to conductive terminals 511 and 512 pulled out from the battery pouch 510, a case 530 for accommodating the PCM 520, a coupling member 540 for fixing the case 530 to the battery pouch 510 while providing a buffering effect, and a finishing member 550 for providing a finishing effect to cover the case 530, in which the PCM 520 is accommodated, together with the battery pouch 510.

According to an embodiment, the battery pouch 510 may include a battery cell (e.g., a battery cell 600 of FIG. 6A or a battery cell 700 of FIG. 7A) inside thereof. The battery cell (e.g., the battery cell 600 of FIG. 6A or the battery cell 700 of FIG. 7A) may include a plurality of plate-type cells which may be wound or stacked, and may be disposed by being interrupted in the battery pouch 510 in which an electrolyte is filled.

According to an embodiment, the battery pouch 510 may include a pouch terrace 5101 contributed as a sealing portion for interrupting the battery cell in which the electrolyte is filled. The pouch terrace 5101 or a lateral wall 5102 of the battery pouch 510 from which the pouch terrace 5101 protrudes may be utilized as a contact or fixed area of the case 510 in which the PCM 520 is accommodated. The battery pouch 510 may be formed of a material such as cast coated paper (CCP), aluminum, nylon, or the like. The pouch terrace 5101 may be sealed and formed by using heating, laser, and the like.

Figure 6A:
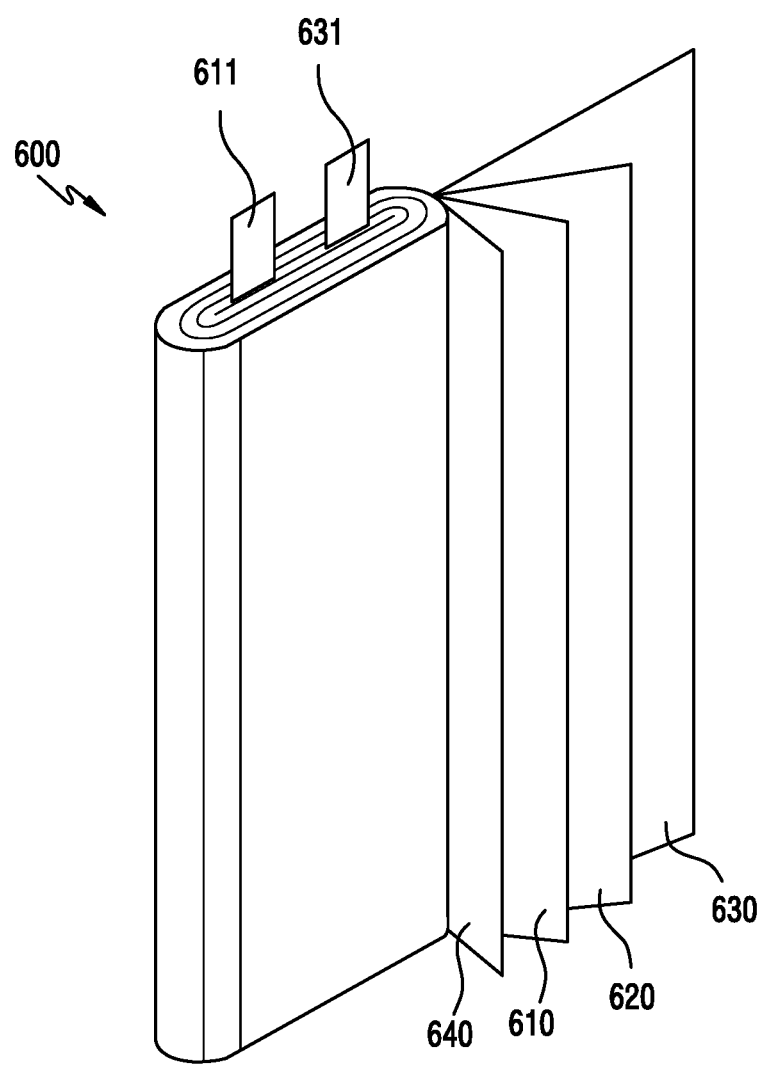
FIG. 6A is a perspective view of a structure of a battery electrode assembly in which a battery cell is wound in a roll type according to an embodiment.
Figure 6B:
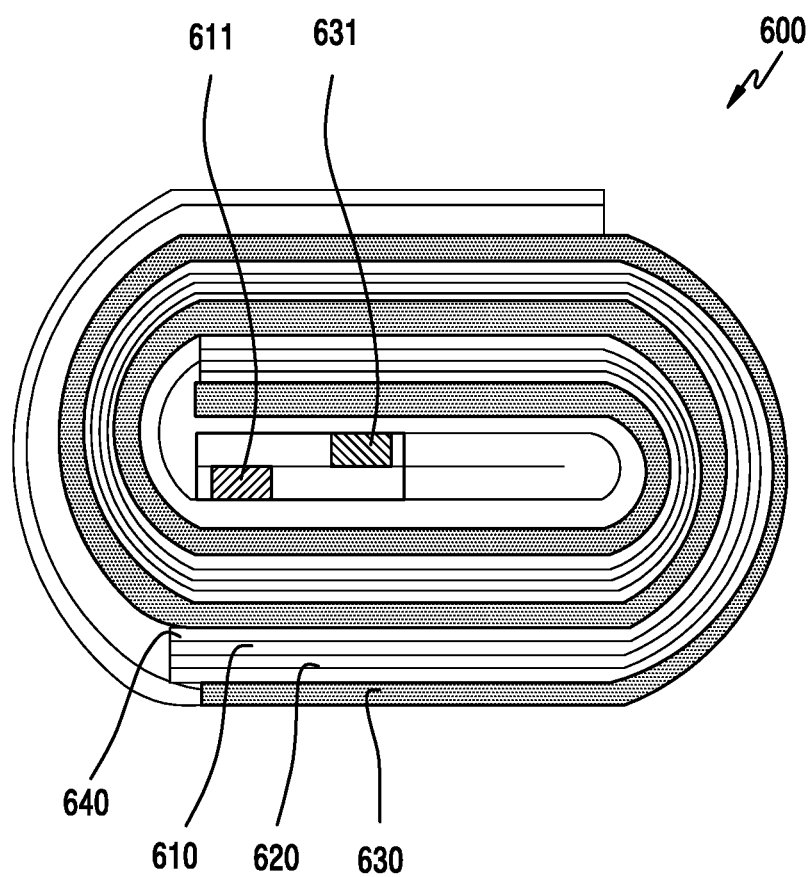
FIG. 6B is a lateral view of a structure of a battery electrode assembly in which a battery cell is wound in a roll type according to an embodiment.
Figure 7A:
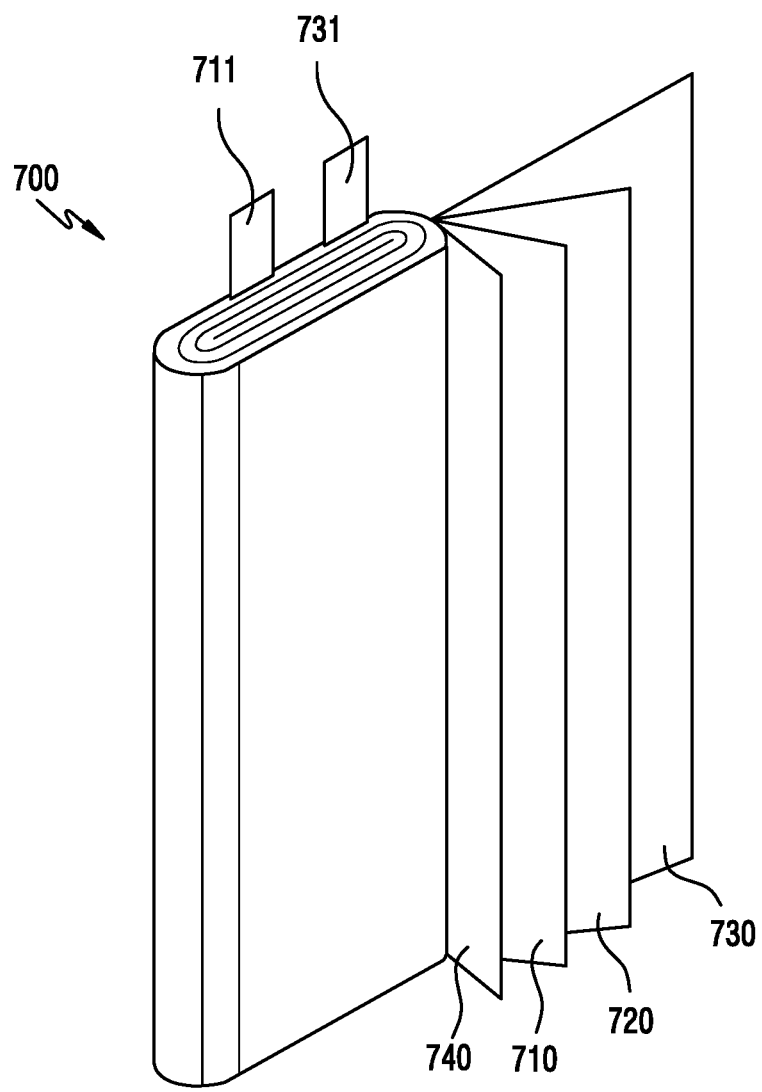
FIG. 7A is a perspective view of a structure of a battery cell according to an embodiment.

According to an embodiment, the battery pouch 510 has the pouch terrace 5101 to which a PCM or the like is mounted, and may include at least one conductive terminal 511 or 512 exposed through the pouch terrace 5101 and electrically connected to an internal battery cell (e.g., the battery cell 600 of FIG. 6A or the battery cell 700 of FIG. 7A). The conductive terminals 511 and 512 may include a negative terminal and a positive terminal FIGS. 6A and 6B are illustrations of a structure of a battery electrode assembly in which a battery cell 600 is wound in a roll type according to an embodiment.

Referring to FIGS. 6A and 6B, the battery cell 600 disposed inside a battery pouch (e.g., the battery pouch 510 of FIG. 5) may be formed in such a manner that plate-type first and second cells 610 and 630 which may be wound are wound together with one pair of separators 620 and 640 for separating the first electrode 610 and the second electrode 630. The battery electrode assembly may be defined as a state after the battery cell is wound in the roll type together with a separator.

According to an embodiment, the one pair of separators 620 and 640 may serve to separate the first electrode 610 and the second electrode 630 so as not to be electrically connected with each other. The first and second electrodes 610 and 630 which are wound multiple times may include corresponding conductive terminals 611 and 631 (e.g., a positive electrode terminal, a negative electrode terminal) protruding from a center area.

Figure 7B:
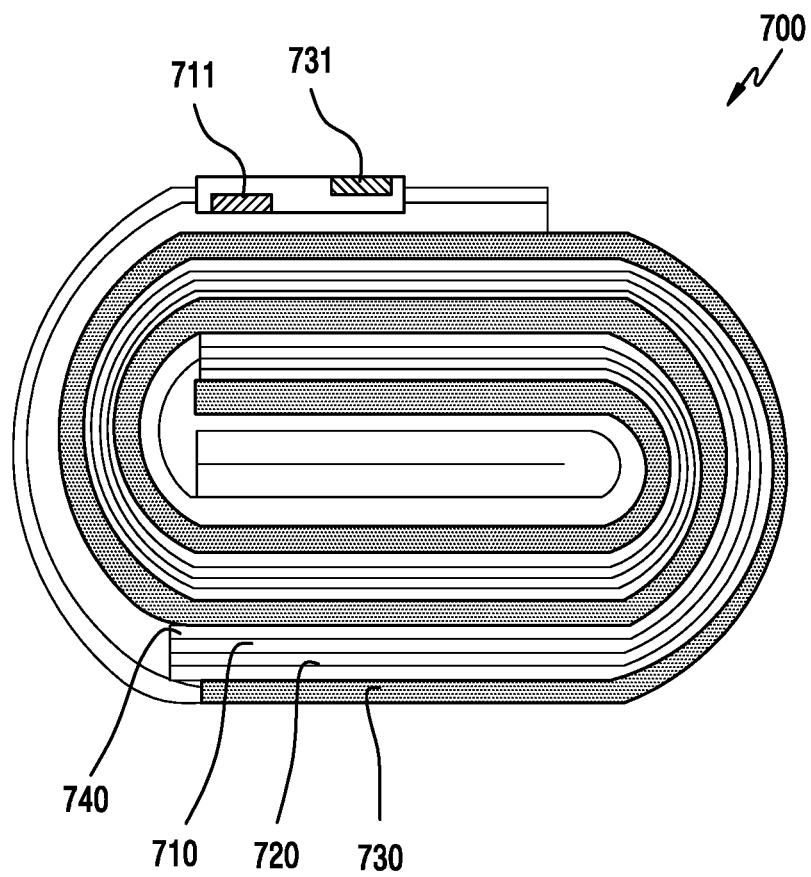
FIG. 7B is a lateral view of a structure of a battery cell according to an embodiment.

FIGS. 7A and 7B are illustrations of a structure of a battery cell 700 according to an embodiment.

Referring to FIGS. 7A and 7B, the battery cell 700 disposed inside a battery pouch (e.g., the battery pouch 610 of FIG. 6) may be formed in such a manner that plate-type first and second cells 710 and 730 which can be wound are wound together with one pair of separators 720 and 740 for separating the first electrode 710 and the second electrode 730. The one pair of separators 720 and 740 may serve to separate the first electrode 710 and the second electrode 730 so as not to be electrically connected with each other.

According to an embodiment, the first and second electrodes 710 and 730 which are wound multiple times may have a thickness, and as illustrated, may include corresponding conductive terminals 711 and 731 (e.g., a positive electrode terminal, a negative electrode terminal) protruding from an outer area.

Returning to FIG. 5, the rechargeable battery 500 may include the PCM 520 to be electrically connected to the conductive terminals 511 and 512 pulled out from the pouch terrace 5101. According to an embodiment, the PCM 520 may include one or more circuit elements capable of electrically protecting all or some parts of the rechargeable battery 500 and a circuit board (e.g., a PCB) on which the circuit elements can be mounted, and may be electrically connected to the conductive terminals 511 and 512 pulled out from the pouch terrace 5101 through the conductive plates 523 and 524.

According to an embodiment, the PCM 520 may be used to maintain voltage (e.g., to prevent over-charging or over-discharging) in a certain range when the battery cell is charged and discharged. For example, if the battery cell is a lithium battery, the PCM 520 may control the cell voltage to operate in any range (e.g., 2V to 4.5V) to prevent damage of the battery cell.

Hereinafter, a structure of an electrode assembly of a rechargeable battery is described according to an embodiment with reference to the accompanying drawings. For example, the battery electrode assembly may be provided with a layer for blocking an overheating state in a positive electrode or a negative electrode or both the positive and negative electrodes to prevent a battery as a secondary cell from being ignited or being locally ignited. A battery cell including an electrode may be defined as a battery electrode assembly, and a state where the battery electrode assembly is assembled with a PCM or the like may be defined as a rechargeable battery. In addition, the rechargeable battery may include a battery pouch.

A layer for regulating or blocking the overheating state of the battery electrode assembly may be configured in various manners according to an embodiment. The layer may be a temperature variable layer or a temperature control layer. For example, the temperature variable layer or the temperature control layer may be any one of a conductive coating layer, a resistance variable layer, or a shape variable layer. The resistance variable layer may be referred to as a temperature variable resistance layer because it performs a function for blocking an electrical function of the electrode by changing resistance depending on a temperature. The resistance variable layer may be referred to as the shape variable layer.

Hereinafter, various structures for blocking the overheating state of the battery electrode assembly are described below. An embodiment of a battery electrode assembly in which a shape variable layer is adopted as a layer for blocking the overheating state of the battery electrode assembly is described below. For example, a lithium-ion battery cell may be applied as a secondary cell to which the battery electrode assembly is applied.

Figure 8A:
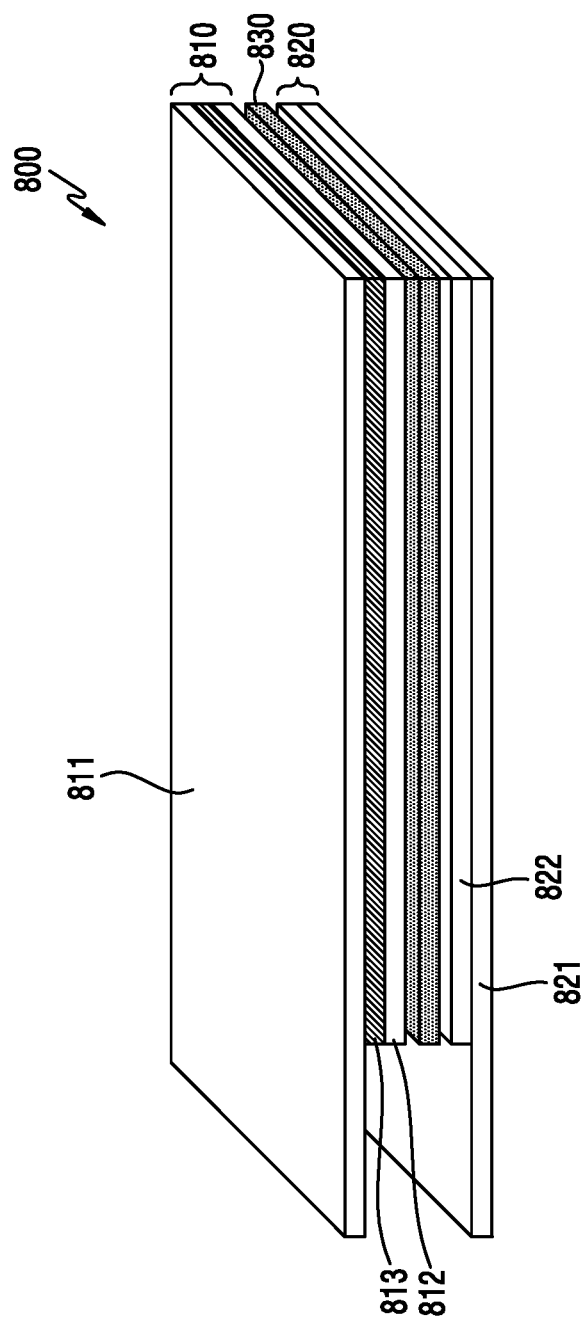
FIG. 8A is a perspective view of a structure of a battery electrode assembly according to an embodiment.
Figure 8B:
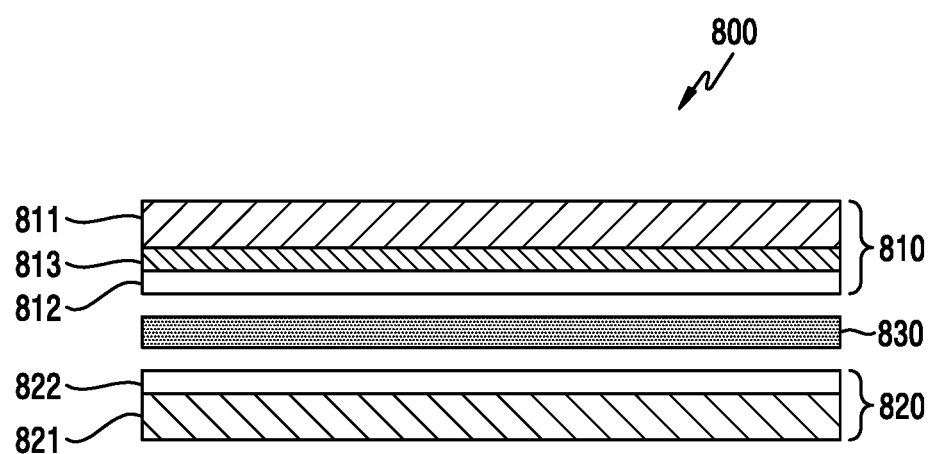
FIG. 8B is a cross-sectional view of a structure of a battery electrode assembly according to an embodiment.
Figure 8C:
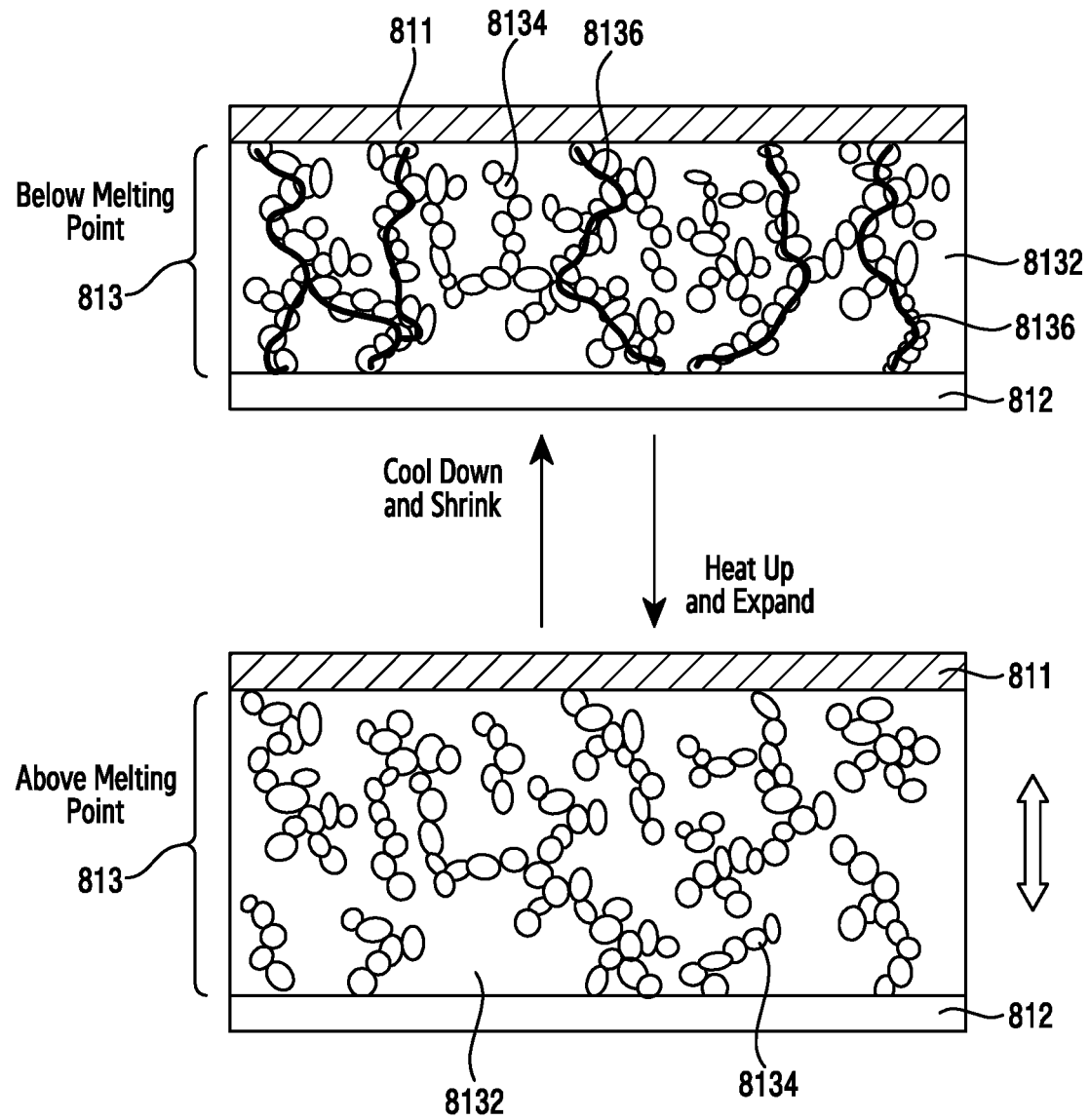
FIG. 8C is an illustration of a before-and-after state of a shape variable layer provided in a battery electrode assembly, depending on a temperature change, according to an embodiment.
Figure 8D:
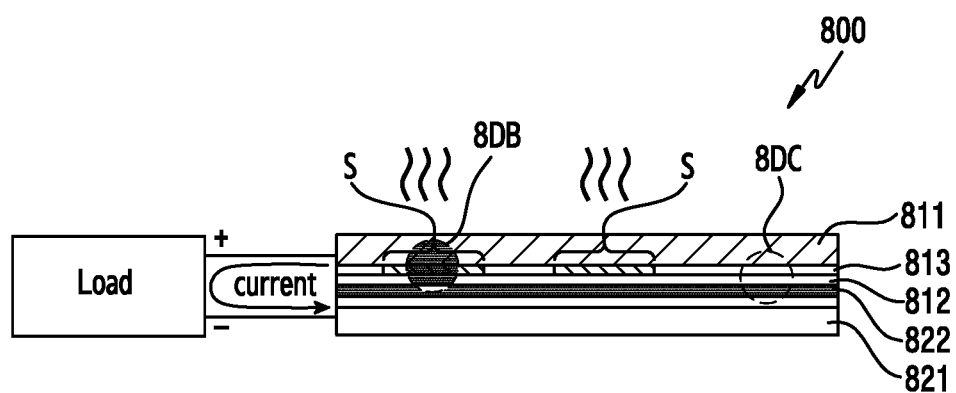
FIGS. 8DA, 8DB, and 8DC are a view of a state of a shape variable layer in a hotspot zone and a shape variable layer in a non-hot stop zone when the hotspot zone occurs in a battery electrode assembly and detail thereof according to an embodiment.
Figure 8D:
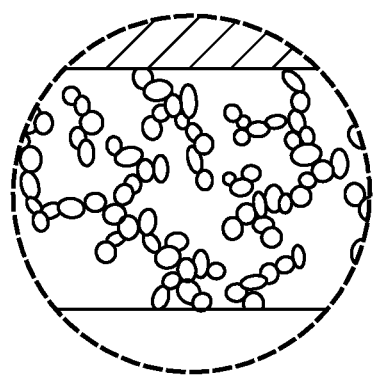
Figure 8D:
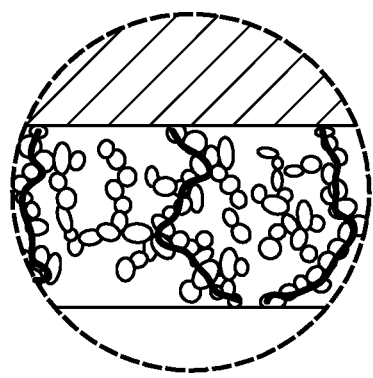

FIG. 8A is a perspective view of a structure of a battery electrode assembly according to an embodiment. FIG. 8B is a cross-sectional view of a structure of a battery electrode assembly according to an embodiment. FIG. 8C is an illustration of a before-and-after state of a shape variable layer provided in a battery electrode assembly, depending on a temperature change, according to an embodiment. FIGS. 8DA, 8DB, and 8DC are illustrations of a state of a shape variable layer in a hotspot zone and a shape variable layer in a non-hot stop zone when the hotspot zone occurs in a battery electrode assembly according to various embodiments.

Referring to FIGS. 8A, 8B, 8C, 8DA, 8DB, and 8DC, a battery electrode assembly 800 of a secondary cell may include a positive electrode 810, a negative electrode 820, and a separator 830. The positive electrode 810 may include a positive electrode substrate layer 811 and a positive electrode active material layer 812, and the negative electrode 820 may include a negative electrode substrate layer 821 and a negative electrode active material layer 822. The positive electrode substrate layer 811 may be referred to as a positive electrode substrate, and the negative electrode substrate layer 821 may be referred to as a negative electrode substrate.

Figure 9:
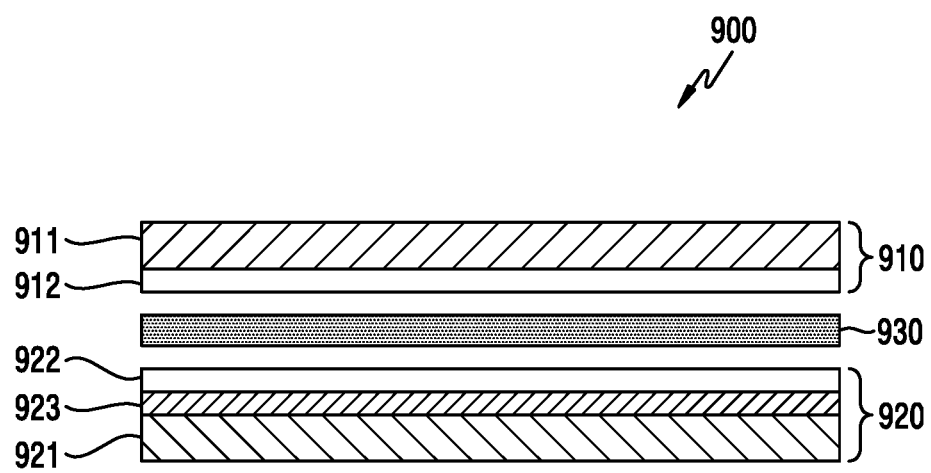
FIG. 9 is a cross-sectional view of a structure of a battery electrode assembly according to an embodiment.
Figure 10:
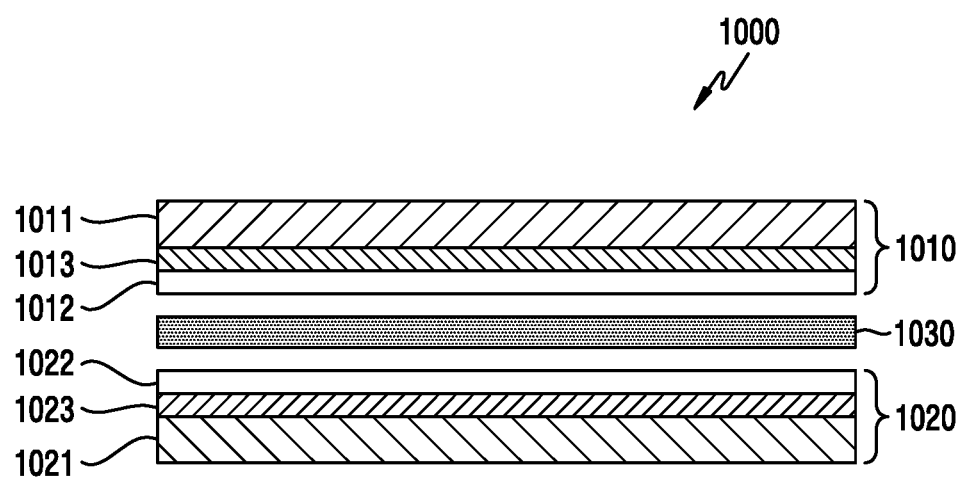
FIG. 10 is a cross-sectional view of a battery electrode assembly according to an embodiment.

For example, the battery electrode assembly 800 of the secondary cell may be provided with a shape variable layer on the positive electrode 810 (see FIG. 8A to FIG. 8DC), a shape variable layer on the negative electrode 820 (see FIG. 9), or a shape variable layer on both the positive electrode 810 and the negative electrode 820 (see FIG. 10). Therefore, the positive electrode substrate layer 811 and the positive electrode active material layer 812 are blocked from each other, or the negative electrode substrate layer 821 and the negative electrode active material layer 822 are blocked from each other, thereby preventing a heating state or a thermal runaway state of the battery electrode assembly 800. A shape variable layer 813 regulates current between the electrode layer and the electrode active material layer, thereby reducing or blocking a current movement between the two layers. For example, the shape variable layer may include a temperature control layer or a conductive coating layer. It should be noted that the rechargeable battery structure according to various embodiments is not necessarily limited to being applied to a jellyroll type battery, and the present disclosure may be equally employed in a stacked battery.

The shape variable layer 813 is a compound having a variable resistance characteristic depending on a temperature change, and may be made of a crystalline polymer material such as an insulating polymer matrix 8132 and conductive filler particles 8134 having conductivity such as a carbon compound. As the temperature of the shape variable layer 813 increases to be greater than or equal to a melting point, the polymer 8132 contained in a crystalline region transitions to an amorphous state, which leads to a volume expansion. As a result, the carbon particles 8134 in a connected state are spaced apart from each other, and thus the flow of electrons may be blocked. That is, a conductive path 8136 formed by the carbon particles 8134 is not formed, thereby blocking the flow of electrons.

For example, in an abnormal state, such as overload or overheating, where a localized hotspot zone 's' occurs, thermal application of the crystalline polymer 8132 and non-crystallization caused by micro-volume expansion are achieved. Therefore, the polymer 8132 and the conductive material 8134, such as carbon particles, may be spaced apart from each other, resulting in a spontaneous autonomous transition to a non-conductive (high resistance) state in a range greater than or equal to a certain melting point. In this case, the shape variable layer 813 may be in charge of a function for protecting an electronic circuit by momentarily blocking current applied to the electronic circuit.

In addition, electrons can flow since the shape variable layer 813 according to an embodiment may have electronic paths 8136 formed by the carbon particles 8134 at a temperature (e.g., a room temperature) less than or equal to the melting point and a normal state. That is, the carbon particles 8134 may act as a conductor by providing the plurality of electrical paths 8136.

When a condition of the abnormal state is removed and thus the temperature is lowered, the shape variable layer 813 returns to an original low resistance value, thereby enabling a normal operation of the electronic circuit.

An example of a polymer resin constituting the shape variable layer 813 according to an embodiment may include polyester, polyurethane having micro-crystallinity, polyolefin, and as a polyolefin-based resin, may include any one of polyethylene (PE), polypropylene (PP), and ethylene vinyl acetate (EVA).

The shape variable layer 813 according to an embodiment may vary based at least in part on a temperature of a portion corresponding to at least the portion of the rechargeable battery. The shape variable layer 813 may be configured to regulate current between a substrate layer corresponding to the positive electrode substrate layer 811 or the negative electrode substrate layer 821 and an active material layer corresponding to the positive electrode active material layer or the negative electrode active material layer 822, based in part on the change of the shape.

The shape variable layer 813 according to an embodiment may use, for example, a shape memory polymer. The battery electrode assembly 800 may have a structure in which the shape memory polymer is coated, adhered, or incorporated into the electrode substrate layers 811 and 821. The electrode substrate layer may include the positive electrode substrate layer 811 or the negative electrode substrate layer 821.

The variable-shape layer 813 according to an embodiment may include a first surface facing a first direction and a second surface facing a second direction opposite to the first direction. An electrode layer corresponding to the positive electrode substrate layer 811 or the negative electrode substrate layer 821 may be attached to the first surface of the shape variable layer 813. A material layer corresponding to the positive electrode active material layer 812 or the negative electrode active material layer 822 may be attached to the second surface.

The shape variable layer 813 according to an embodiment may play a role of performing a temperature control through the change of the shape. Although a boundary of the shape variable layer 813 and the positive electrode active material layer 812 is represented by a plane, this is only for schematically representing a structure of the electrode. In practice, there may be a mixed region in the boundary of those layers. Therefore, it may be difficult to clearly define the boundary between those layers.

In addition, at a normal operating temperature of the rechargeable battery, electrons flow smoothly between the positive electrode active material layer 812 and the positive electrode layer 811. This is because a material contained in the shape variable layer 813 has constant conductivity at a corresponding temperature. However, when the temperature of the rechargeable battery increases, resistance of the material contained in the shape variable layer 813 sharply increases. Therefore, electrons cannot flow between the positive electrode active material layer 812 and the positive electrode substrate layer 811 via the temperature control layer 813, thereby blocking the current. As a result, it is possible to prevent a thermal runaway phenomenon or the like of a cell.

The positive electrode 810 according to an embodiment may be manufactured by applying, for example, a mixture of the positive electrode active material layer 812, a conductive material, and a binder to the positive electrode substrate layer 811, and a filling may be further added to the positive electrode mixture.

The positive electrode substrate layer 811 is generally manufactured with a very thin thickness of 3 to 300 μm, and is not particularly limited as long as it has high conductivity without causing a chemical change in the rechargeable battery. For example, one of selected from steel, aluminum, nickel, titanium, and a material subjected to surface treatment with carbon, nickel, titanium, or silver on the surface of aluminum or stainless steel may be used. For example, aluminum may be used.

An example of the positive electrode active material layer 812 according to an embodiment may include a layered compound such as lithium cobalt oxide ($LiCoO_2$), lithium nickel oxide ($LiNiO_2$), and the like or a compound substituted to other transition metal materials; lithium manganese oxide such as $Li_{1+x}Mn_{2-x}O_4$ (where x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiV_3O_4$, $V_2O_5$, and $Cu_2V_2O_7$; Ni-site type lithium nickel oxide represented by the formula $LiNi_{1-x}M_xO_2$ (where M=Co, Mn, Al, Cu, Fe, Mg, B, or Ga, and x=0.01 to 0.3); lithium manganese complex oxide represented by the formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; $Fe_2(MoO_4)_3$, and the like, but the present disclosure is not limited thereto.

The negative electrode according to an embodiment may be manufactured by applying a negative electrode mixture containing a negative electrode active material, an additive agent, a conductive material, and a binder to a negative electrode substrate layer, and may selectively further include a filler or the like.

The material of the negative electrode substrate layer according to an embodiment is not particularly limited as long as it has conductivity without causing a chemical change in the cell, and may use, for example, copper, stainless steel, aluminum, nickel, titanium, baked carbon, a material, which is subjected to surface treatment with carbon, nickel, titanium, silver, and the like on the surface of copper or stainless steel, aluminum-cadmium alloy, and the like. The negative electrode substrate layers may have the same thickness in the range of 3 to 300 μm, and optionally may have different values.

An example of the material of the negative electrode active material layer according to an embodiment may include carbon such as non-graphitized carbon, graphite carbon, or the like; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group-1, 2, and 3 elements on the periodic table, halogen; $0 \leq x \leq 1$; $1 \leq y \leq 3$; $1 \leq z \leq 8$), and the like; lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymer such as polyacetylene; Li—Co—Ni-based material, and the like.

The separator according to an embodiment is disposed between the positive layer and the negative layer, and an insulating thin film having high ion permeability and mechanical strength is used. A pore diameter of the separator is typically 0.01 to and a thickness thereof is typically 5 to 30 μm. An example of the separator includes olefin-based polymer such as chemically-resistant and hydrophobic polypropylene and the like; and a sheet or nonwoven fabric made of glass fiber, polyethylene, and the like. When a solid electrolyte such as a polymer is used as an electrolyte, the solid electrolyte may also serve as the separator.

In addition, the rechargeable battery according to an embodiment is manufactured in such a manner that the battery electrode assembly is embedded in a battery case together with an electrolyte solution. The battery may be configured in a structure in which a stacked/foldable-type electrode assembly is embedded in a pouch-type battery case of an aluminum laminate sheet, and thus a non-aqueous electrolyte containing lithium salt is impregnated. The non-aqueous electrolyte containing lithium salt consists of a non-aqueous electrolyte and a lithium salt. Although a non-aqueous organic solvent, an organic solid electrolyte, an inorganic solid electrolyte, and the like is used as the non-aqueous electrolyte, the non-aqueous electrolyte is not limited thereto.

FIG. 9 is a cross-sectional view of a structure of a battery electrode assembly 900 according to an embodiment.

Referring to FIG. 9, the battery electrode assembly 900 of a secondary cell may include a positive electrode 910, a negative electrode 920, and a separator 930. The positive electrode 910 may include a positive electrode substrate layer 911 and a positive electrode active material layer 912. The negative electrode 920 may include a negative electrode substrate layer 921 and a negative electrode active material layer 922.

The battery electrode assembly 900 according to an embodiment has a shape variable layer 923 on the negative electrode 920 to block the negative electrode layer 911 and the negative electrode active material layer 912 from each other, thereby preventing a heating state or a thermal runaway state of the battery electrode assembly 900.

The shape variable layer 923 according to an embodiment is a compound having a variable resistance characteristic depending on a temperature change, and may be made of, for example, a crystalline polymer material and a conductive carbon compound. As the temperature of the shape variable layer 923 increases, the polymer contained in a crystalline region transitions to an amorphous state, which leads to a volume expansion. As a result, carbon particles in a connected state are spaced apart from each other, thereby blocking the flow of electrons.

FIG. 10 is a cross-sectional view of a battery electrode assembly 1000 according to an embodiment.

Referring to FIG. 10, the battery electrode assembly 1000 of a secondary cell may include a positive electrode 1010, a negative electrode 1020, and a separator 1030. The positive electrode 1010 may include a positive electrode substrate layer 1011 and a positive electrode active material layer 1012, and the negative electrode 1020 may include a negative electrode substrate layer 1021 and a negative electrode active material layer 1022.

The battery electrode assembly 1000 according to an embodiment is provided with a first shape variable layer 1013 on the positive electrode 1010 to block the positive electrode substrate layer 1011 and the positive electrode active material layer 1012 from each other, thereby preventing a heating state or a thermal runaway state of the battery electrode assembly 1000. In addition, the battery electrode assembly 1000 is provided with a second shape variable layer 1023 on the negative electrode 1020 to block the negative electrode substrate layer 1011 and the negative electrode active material layer 1012 from each other, thereby preventing the heating state or the thermal runaway state of the battery electrode assembly 1000.

Each of the first and second shape variable layers 1013 and 1023 according to an embodiment is a compound having a variable resistance characteristic depending on a temperature change, and may be made of, for example, a crystalline polymer material and a conductive carbon compound. As the temperature of each of the first and second shape variable layers 1013 and 1023 increases, the polymer contained in a crystalline region transitions to an amorphous state, which leads to a volume expansion. As a result, carbon particles in a connected state are spaced apart from each other, thereby blocking the flow of electrons.

Figure 11:
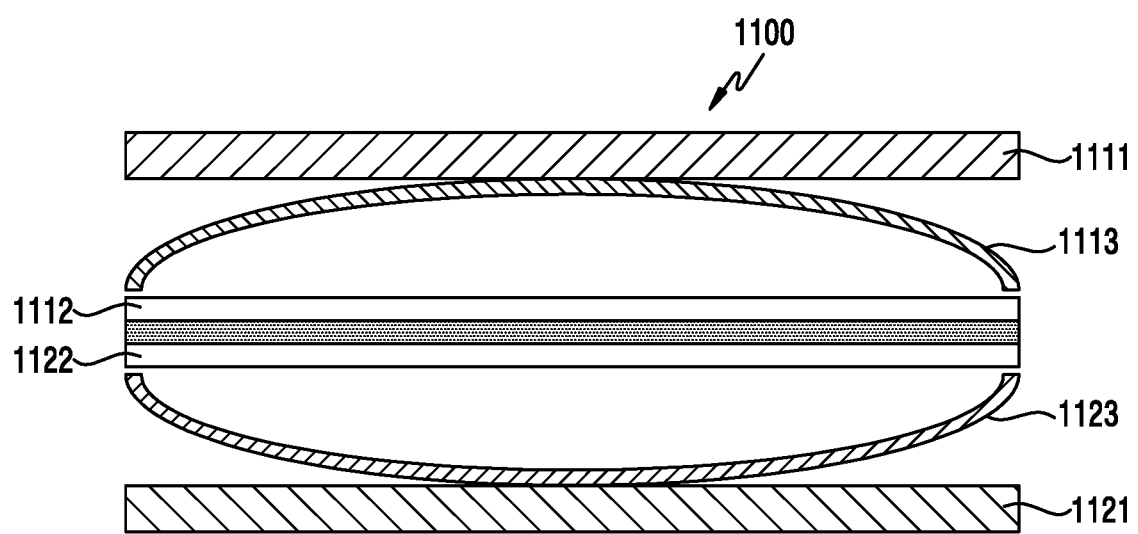
FIG. 11 is a cross-sectional view of a battery electrode assembly according to an embodiment.

FIG. 11 is a cross-sectional view of a battery electrode assembly 1100 according to an embodiment.

Referring to FIG. 11, the battery electrode assembly 1100 exhibits a low resistance increase at a level which does not affect a battery operation at a normal usage temperature, and shape variable layers 1113 and 1123 change in shape at a temperature greater than or equal to a certain temperature, thereby blocking an electric function of an electrode.

For example, the shape variable layer 1113 changes shape to have a directivity, and thus a positive electrode substrate layer 1111 and a positive electrode active material layer 1112 may be separated in a direction away from each other, thereby blocking the positive electrode substrate layer 1111 and the positive electrode active material layer 1112 from each other. In addition, the shape variable layer 1123 changes shape to have a directivity, and thus a negative electrode substrate layer 1121 and a negative electrode active material layer 1122 may be separated in a direction away from each other, thereby blocking the negative electrode substrate layer 1121 and the negative electrode active material layer 1122 from each other.

The shape variable layers 1113 and 1123 according to an embodiment are shape memory polymer layers, and may be made of polymer materials which are materials having a dual structure of a reversible phase and a stationary phase. For example, the shape memory polymer layer may have a different shape depending on external impacts (temperature, light, humidity, pH (e.g., acidity), electric field, magnetic field, etc.), and may maintain its shape as long as the impact is no longer applied thereto. However, when a substance in the stationary phase is heated, it is converted to the reversible phase at a certain temperature. This temperature is called a glassy temperature Tg, and is called a shape recovery temperature. A representative example of the shape variable layers 1113 and 1113 includes polynorbornene. The shape variable layers 1113 and 1113 changes in size depending on a temperature or pressure, and this size change may also be regarded as a change of a shape.

The battery electrode assembly according to an embodiment informs a user of an alarm pop-up to a device used for detecting a change such as an increase in resistance when the shape variable layer transitions from the stationary phase to the reversible phase, thereby preventing a safety accident depending on a battery failure.

FIG. 12A, 12B, 12C, and FIG. 12D are views of nano-mesh structures of a shape variable layer according to an embodiment.

Referring to FIG. 12A to FIG. 12D, a shape variable layer may be configured in a nano-mesh structure having patterns of various shapes. The shape variable layer may have a nano-mesh structure, and thus the shape variable layer may perform a binder function between an electrode layer and an electrode active material layer.

Figure 12A:
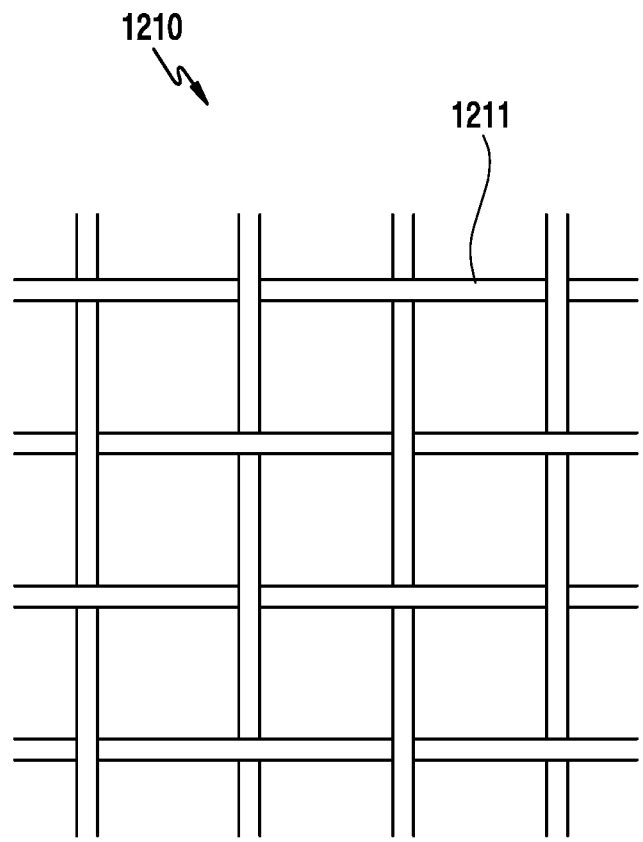
FIG. 12A, 12B, 12C, and FIG. 12D are views of nano-mesh structures of a shape variable layer according to an embodiment.

Referring to FIG. 12A, a shape variable layer 1210 (e.g., a reference numeral 813 in FIG. 8A, a reference numeral 923 in FIG. 9, or reference numerals 1013 and 1023 in FIG. 10) may be constructed of a repetitive pattern 1211 of a rectangular array. The repetitive pattern may be disposed on all or some parts of the shape variable layer.

Figure 12B:
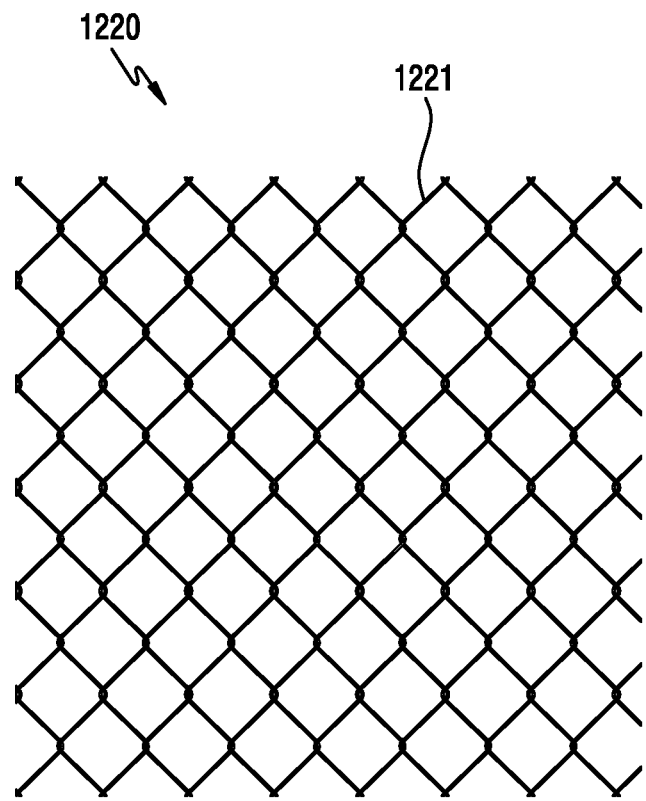

Referring to FIG. 12B, a shape variable layer 1220 (e.g., a reference numeral 813 of FIG. 8A, a reference numeral 923 of FIG. 9, or reference numerals 1013 and 1023 of FIG. 10) may be constructed of a repetitive pattern 1221 of a rhombic array.

Figure 12C:
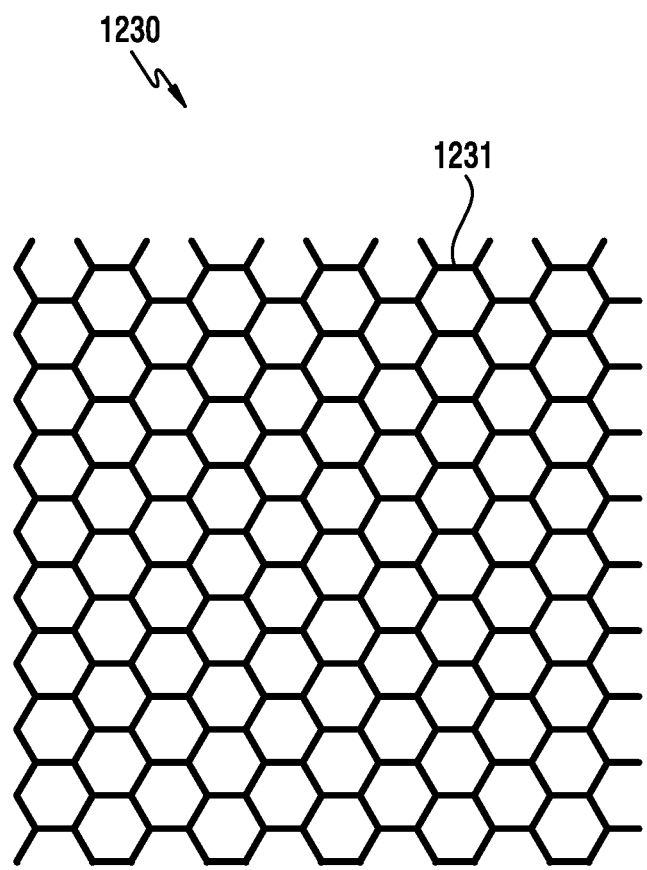

Referring to FIG. 12C, a shape variable layer 1230 (e.g., a reference numeral 813 in FIG. 8A, a reference numeral 923 in FIG. 9, and reference numerals 1013 and 1023 in FIG. 10) may be constructed of a repetitive pattern 1231 of a comb array.

Figure 12D:
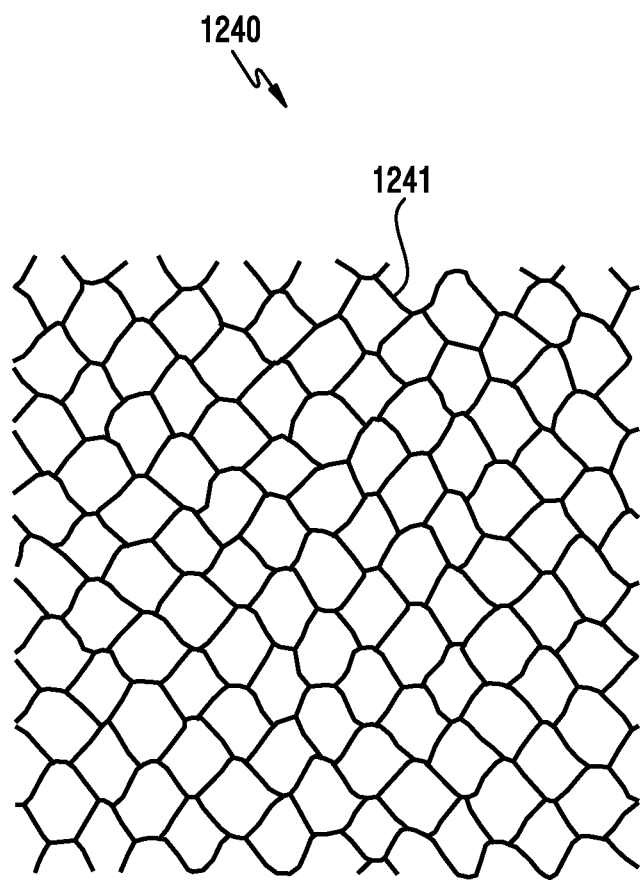

Referring to FIG. 12D, a shape variable layer 1240 (e.g., a reference numeral 813 in FIG. 8A, a reference numeral 923 in FIG. 9, and reference numerals 1013 and 1023 in FIG. 10) may be constructed of a repetitive pattern 1241 of a random array.

Each of the shape variable layers is configured in the aforementioned nano-mesh structure to separate the electrode layer and the electrode active material layer from each other at an abnormal temperature, e.g., an overheating temperature, thereby blocking the flow of electrons. When pattern coating is performed at the normal temperature as in the case of the nano-mesh structure, it may be advantageous to cell characteristics in comparison with the structure in which the shape variable layer is applied to the total surface between the positive/negative electrode layer and the positive/negative electrode active material layer, and adhesion between the electrode layer and the electrode active material layer may be improved.

Hereinafter, the shape variable layer provided in the battery electrode assembly may be variously configured according to a pattern shape, a thickness of a pattern line, density (interval) of the pattern line, and other properties.

Figure 13A:
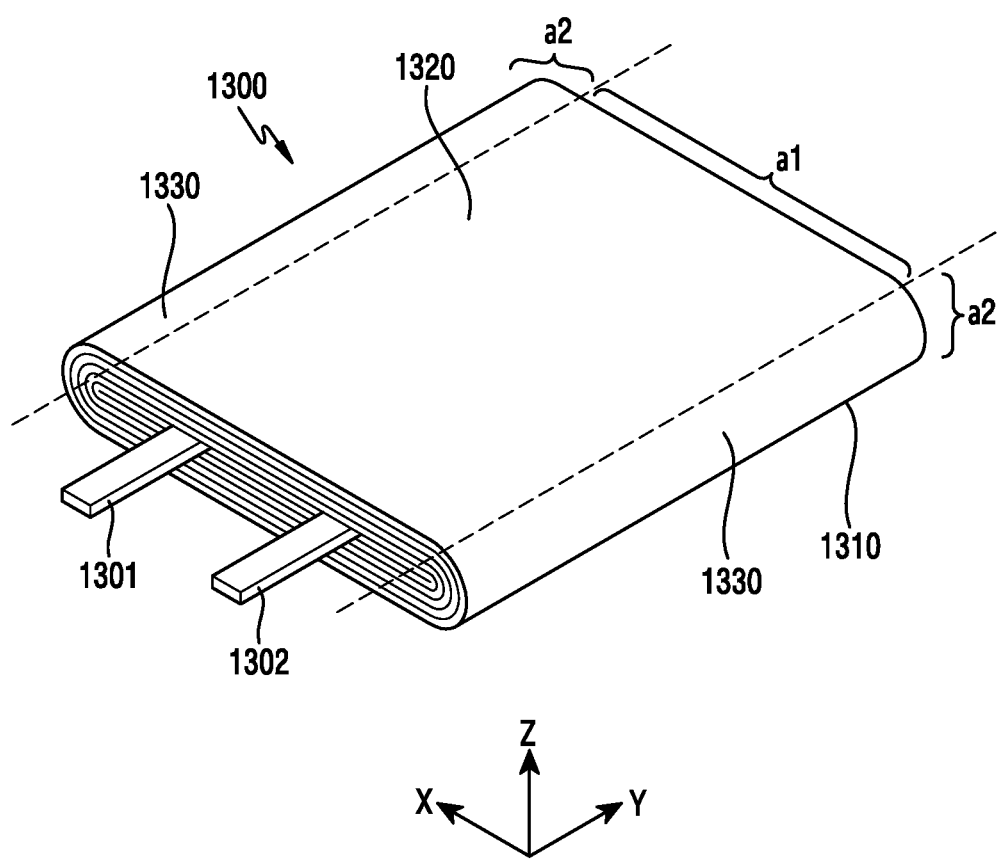
FIG. 13A is a perspective view of a battery electrode assembly which is wound in a roll type according to an embodiment.
Figure 13B:
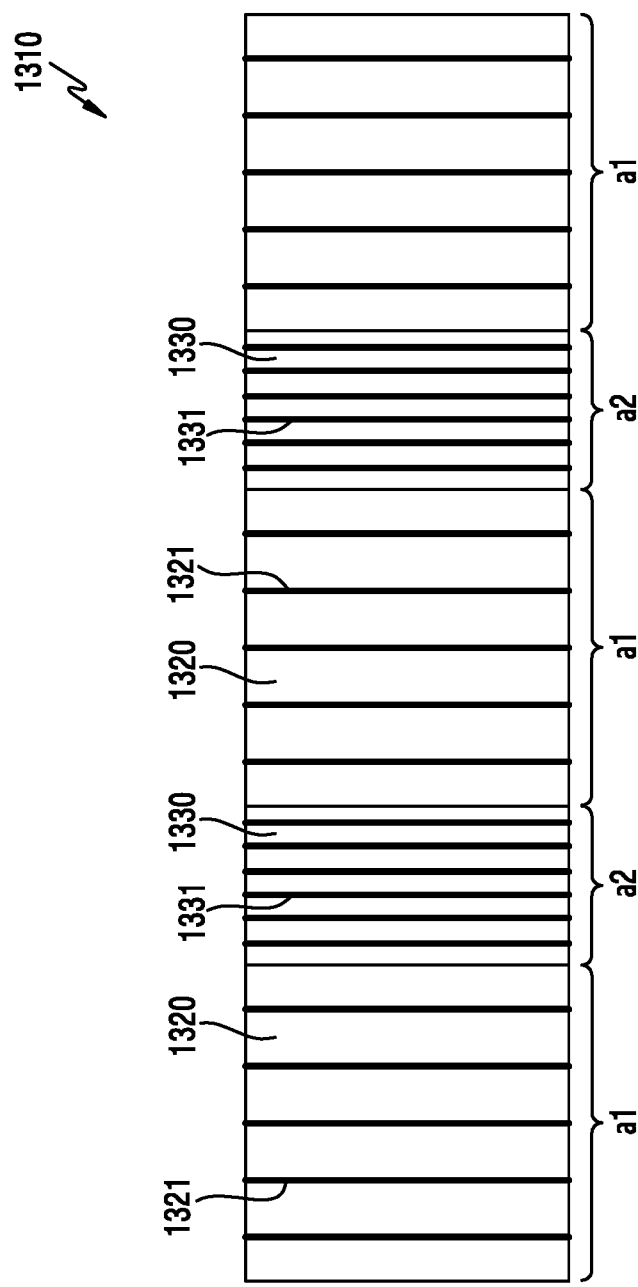
FIG. 13B is an illustration of first and second patterns provided in first and second regions of a shape variable layer according to an embodiment.

FIG. 13A is an illustration of a battery electrode assembly 1300 after a battery cell 1310 is wound a plurality of times in a roll type, and FIG. 13B is an illustration of an unfolded state before the battery cell 1310 is wound according to an embodiment.

Referring to FIGS. 13A and 13B, an orthogonal coordinate system is used. An X-axis represents a widthwise direction of the battery electrode assembly 1300, a Y-axis represents a lengthwise direction of the battery electrode assembly 1300, and a Z-axis represents a thickness direction, e.g., a vertical direction, of the battery electrode assembly 1300. In addition, the X-axis represents the lengthwise direction when the battery cell 1310 is in the unfolded state (FIG. 13B).

The battery electrode assembly 1300 according to an embodiment is a roll-type secondary cell in which the battery cell 1310 is wound a plurality of times. In this case, when the battery cell 1310 is wound, a winding count may be different depending on the thickness. The battery electrode assembly 1300 completely manufactured is substantially plate-shaped, and may include at least one flat portion 1320 and at least one bending portion 1330 between the flat portions 1320. The bending portion 1330 is a portion which is bent, and thus may also be referred to as a bent portion or a curved portion, and is a portion which is subjected to a stress, and thus may also be referred to as a stress generating portion or a stress concentration portion.

The flat portion (region) 1320 is a top or bottom surface, and may be a substantially planar region partially having an error tolerance. The bending portion (bent region) 1330 is a top or bottom surface, and may be a region which is substantially bendable and which partially has an error tolerance.

When the battery cell 1310 of FIG. 13B is wound at least one time, there may be at least one flat portion 1320 and at least one bending portion (bent portion) 1330. For example, a stress may be higher at the bending portion 1330 than at the flat portion 1320, and thus a shape variable layer (or a temperature control layer) in the flat portion 1320 may be configured differently from a shape variable layer in the bending portion 1330. Hereinafter, the flat region will be referred to as a first region a1, and the bending region will be referred to as a second region a2. In addition, in FIG. 12A to FIG. 12D described above, each pattern disposed on the shape variable layer may be configured in the same pattern.

The battery cell 1310 according to an embodiment may be formed by alternating the first and second regions a1 and a2 along the lengthwise direction. The first pattern 1321 of the shape variable layer in the first region a1 may be configured differently from the second pattern 1331 of the shape variable layer in the second region a2. For example, an inter-pattern distance (a first interval) of the first pattern 1321 may be configured to be narrower than an inter-pattern distance (or a second interval) of the second pattern 1331. Each of a plurality of first patterns 1321 may be oriented in the Y-axis direction, each of the plurality of second patterns 1331 may be oriented in the Y-axis direction, and each inter-pattern distance of the second pattern 1331 may be configured narrowly. In this case, a stress which occurs when the second region a2 is bent is taken into account to configure the battery cell 1310 in a roll type. An inter-pattern distance of the first pattern 1321 is configured to be equally spaced, and an inter-pattern distance of the second pattern 1331 is configured to be equally spaced. However, without being limited thereto, the inter-pattern distance of the first pattern 1321 may not be configured to be equally spaced, and the inter-pattern distance of the second pattern 1331 may not be configured to be equally spaced.

The first pattern 1321 and the second pattern 1331 according to an embodiment are patterns which change depending on a temperature, and thus may be respectively referred to as a first temperature variable pattern and a second temperature variable pattern. Reference numerals 1301 and 1302 designate a positive electrode terminal (a positive electrode tab) and a negative electrode terminal (a negative electrode tab), respectively. A pattern line of the first pattern 1321 may be disposed with a first interval with respect to a designated (e.g., pre-determined) direction, and a pattern line of the second pattern 1331 may be disposed with a second interval with respect to the designated direction. The aforementioned designated direction may include a lengthwise direction, a widthwise direction, or a height direction.

Figure 13C:
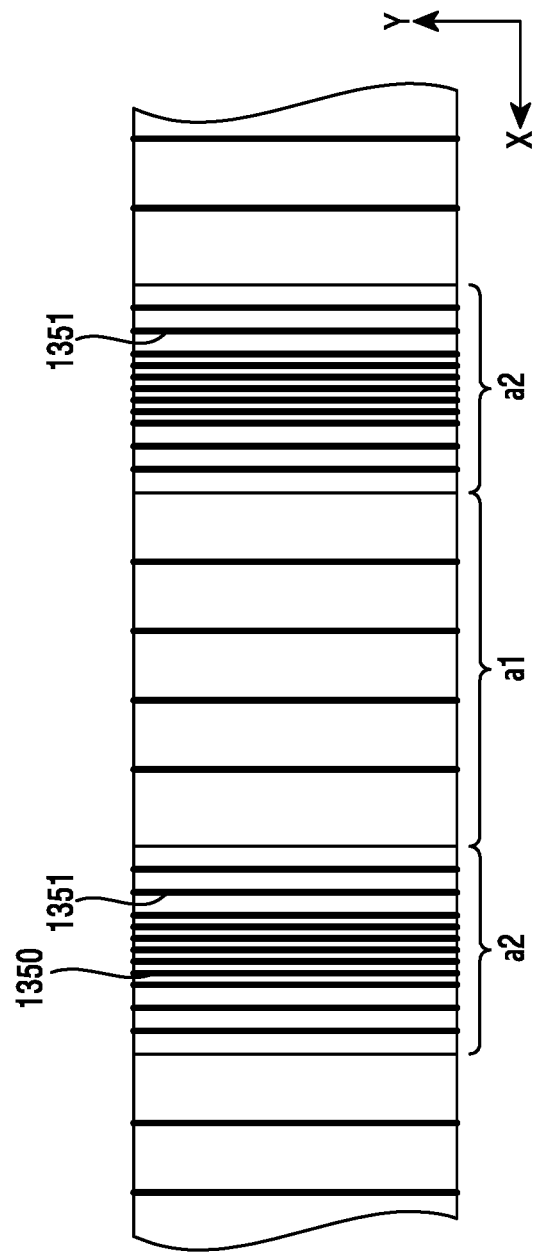
FIG. 13C is an illustration of first and second patterns provided in first and second regions of a shape variable layer according to an embodiment.

Referring to FIG. 13C, an inter-pattern distance of shape variable layers in the second region a2 may be configured to be different than in FIG. 13B. For example, in the second region a2, a center portion may be configured such that a distance between patterns 1351 is narrow, and both side portions deviating from the center may be constructed of a pattern 1350 that is not narrower than the center portion. Since the greatest stress occurs when the center portion is bent in the second region a2, a distance between the patterns 1351 in the center portion of the second region a2 may be configured to be relatively narrower than both sides thereof.

Further, the inter-pattern distance in the second region a2 of the shape variable layer may become gradually narrower toward the center portion and may become gradually wider toward the both side portions.

Figure 14A:
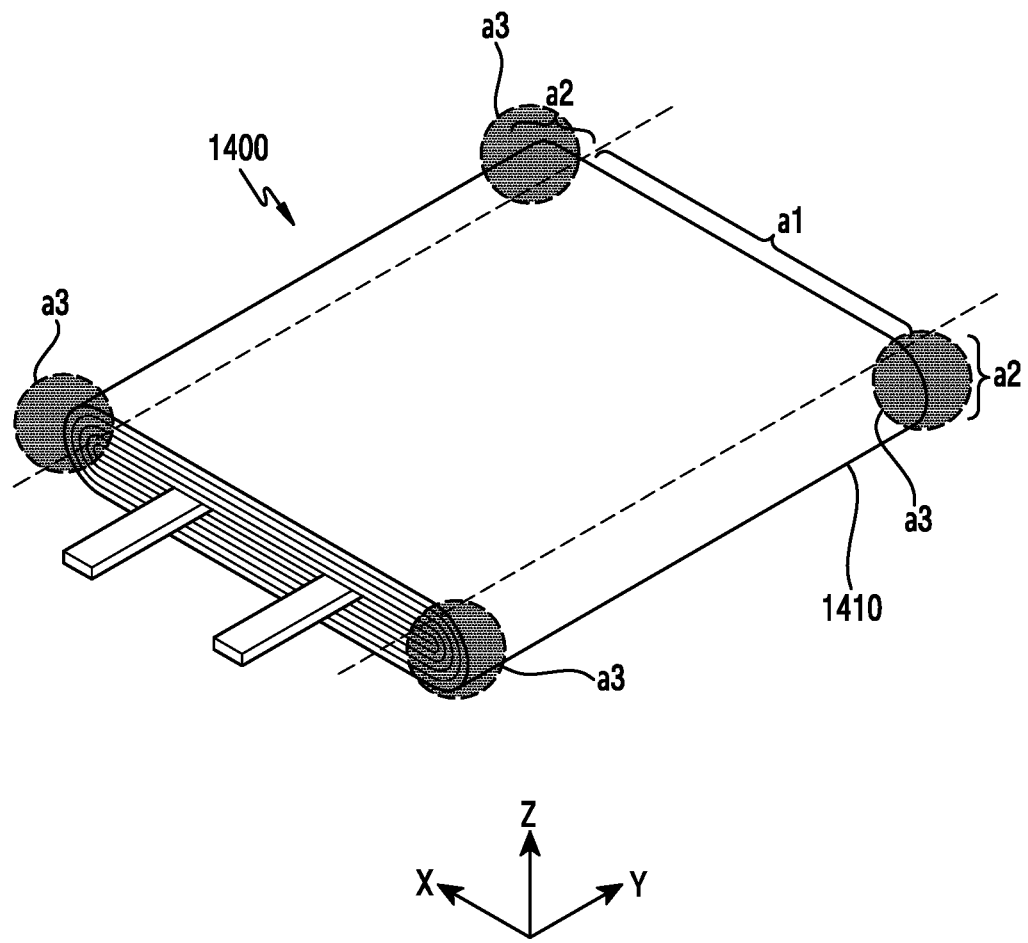
FIG. 14A is a perspective view of a battery electrode assembly which is wound in a roll type according to an embodiment.
Figure 14B:
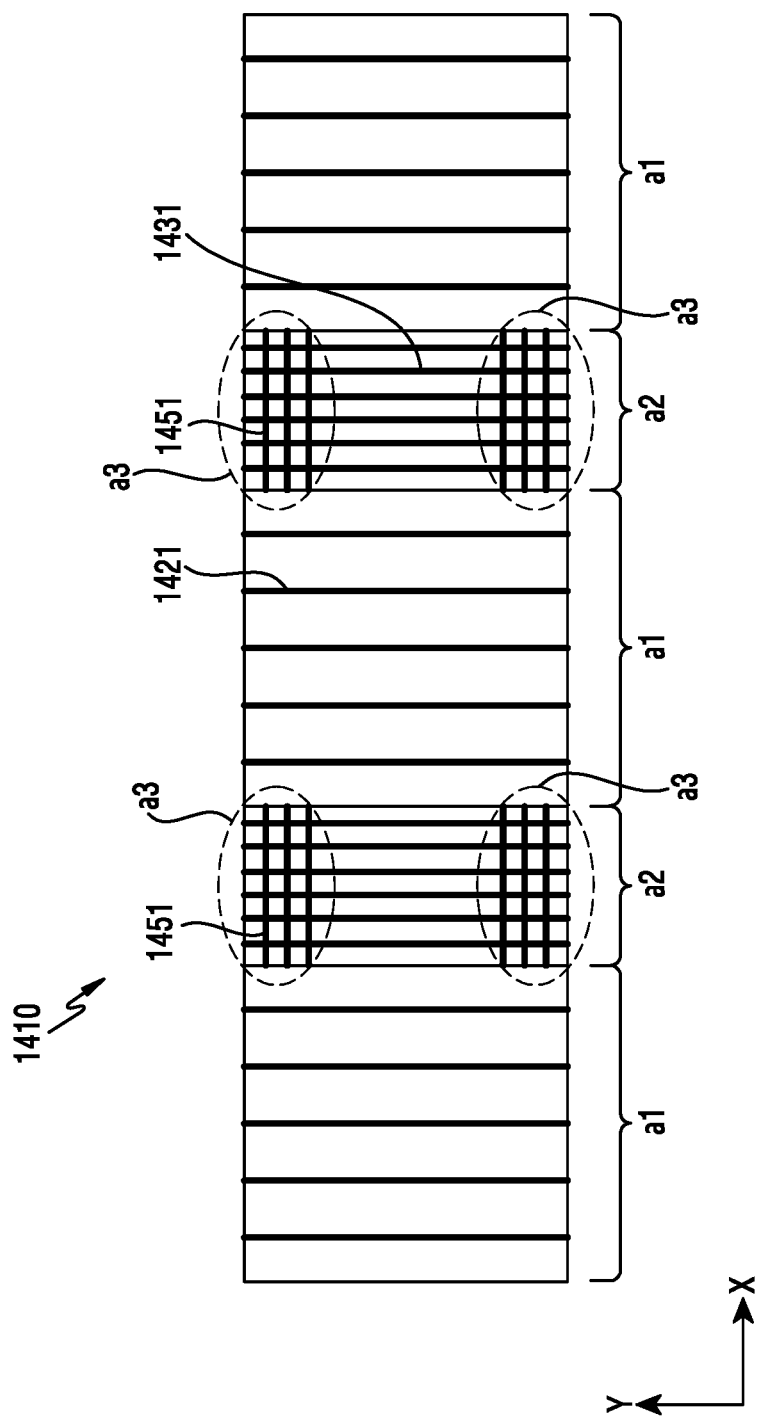
FIG. 14B is an illustration of first, second, and third patterns provided in first, second, and third regions of a shape variable layer according to an embodiment.

FIG. 14A is a perspective view of a battery electrode assembly 1400 which is wound in a roll type according to an embodiment. FIG. 14B is an illustration of first, second, and third patterns provided in first, second, and third regions of a shape variable layer, respectively, according to an embodiment.

Referring to FIGS. 14A and 14B, the battery electrode assembly 1400 is described below by focusing on only the different parts in comparison with the battery electrode assembly 1300 of FIGS. 13A and 13B, and detailed descriptions of parts configured in the same structure are omitted here to avoid redundancy. The battery electrode assembly 1400 may include at least one third regions a3 in which at least one third pattern 1451 is disposed to the second region a2.

In the battery cell 1410 according to an embodiment, at least one third pattern 1451 may be disposed to the second region a2. For example, the third pattern 1451 may consist of at least one pattern oriented in an X-axis direction. At least one third pattern 1451 may be disposed to each second region a2. For example, the third patterns 1451 may be disposed at a top or bottom end of the second region a2 or may be disposed respectively at the top end and the bottom end. The third pattern 1451 may be disposed at each corner of the battery electrode assembly 1400. Each of patterns constituting the third pattern 1451 may be configured to be equally spaced or may not be configured to be equally spaced. For example, each of the patterns of the third pattern 1451 may be densely configured in a place where the bending is severe. That is, when the battery cell 1410 is wound, a stresses may be different in case of bending occurring in the second region a2, and thus the third patterns configured in the second regions a2 may be configured to be equally spaced or may be configured to be differently spaced. For example, since each corner portion of the battery electrode assembly 1400 configured in a roller type is susceptible to impacts and is a bending portion, each pattern of the third patterns 1451 may be configured more densely than each pattern of the first pattern 1421 of the first region a1 or the second pattern 1431 of the second region a2.

Figure 14C:
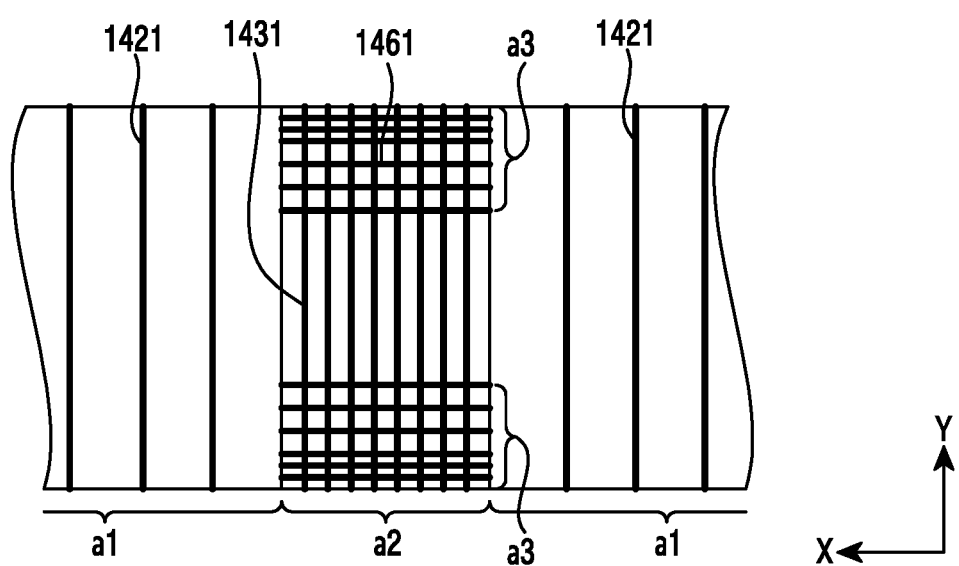
FIG. 14C is an illustration of first, second, and third patterns provided in first, second, and third regions of a shape variable layer according to an embodiment.

FIG. 14C is an illustration of first, second, and third patterns provided in first, second, and third regions of a shape variable layer, respectively, according to an embodiment.

Referring to FIG. 14C, a distance between patterns 1461 of a shape variable layer in a third region a3 may be configured different than FIG. 14B. For example, the patterns 1461 may be configured such that an inter-pattern distance is narrow in a peripheral region of the third region a3 in comparison with a central portion, and is not narrow when it is far from the periphery. When the center portion is bent in the third region a3, since the corner portion is most stressed, by considering this, the inter-pattern distance in the peripheral region of the third region a3 may be configured to be relatively narrower than the center portion.

In addition, the inter-pattern distance in the third region of the shape variable layer may gradually become narrower toward the peripheral region portion, and may gradually become wider toward the center portion.

Figure 15:
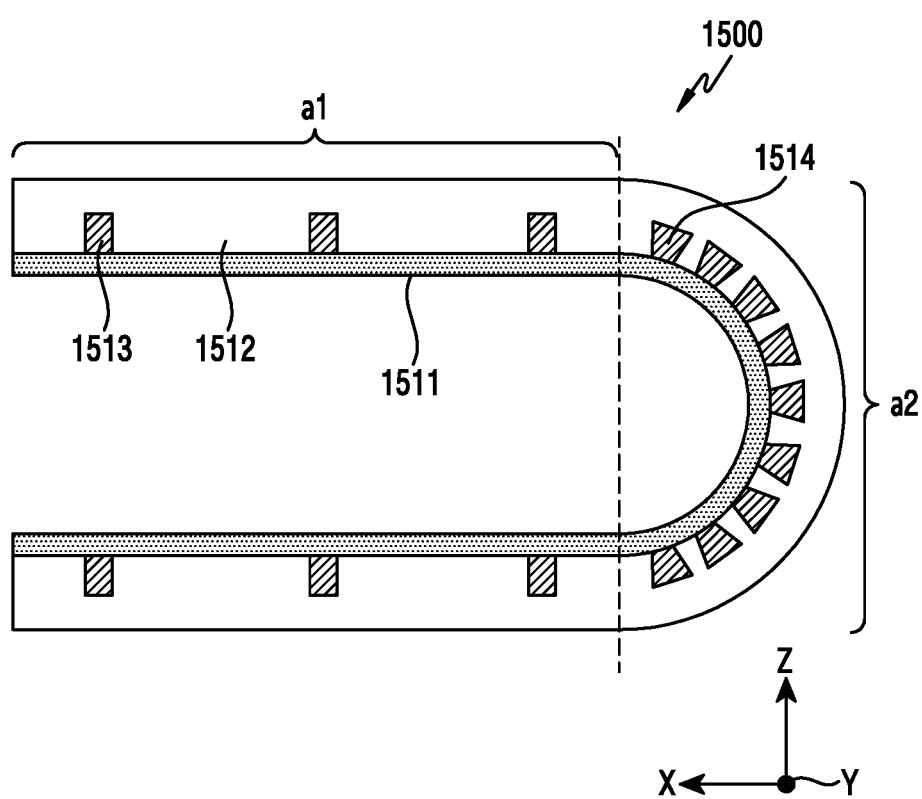
FIG. 15 is a cross-sectional view of first and second patterns provided in first and second regions of a shape variable layer according to an embodiment.

FIG. 15 is a cross-sectional view of first and second patterns provided in first and second regions of a shape variable layer, respectively, according to an embodiment.

Referring to FIG. 15, a battery electrode assembly 1500 is described below by focusing on only different parts in comparison with the battery electrode assembly 1300 of FIGS. 13A and 13B, and detailed descriptions of parts configured in the same structure are omitted here to avoid redundancy.

The second pattern 1514 disposed to the second area a2 according to an embodiment may be configured to be densely spaced from each other than the first pattern 1513 disposed to the first area a1, and a pattern cross-section of each second pattern 1514 may be configured differently from a pattern cross-section of each first pattern 1513.

The battery electrode assembly 1500 according to an embodiment may be configured such that the shape variable layers 1513 and 1514 are included in the active material layer 1512. That is, the shape variable layers 1513 and 1514 and the active material layer 1512 may be disposed on the same layer. For example, the electrode layer 1511 may be a positive electrode layer and the active material layer may be a positive electrode active material layer 1512. When the electrode layer 1511 is the negative electrode layer, the active material layer may be constructed of the negative electrode active material layer 1512.

Figure 16:
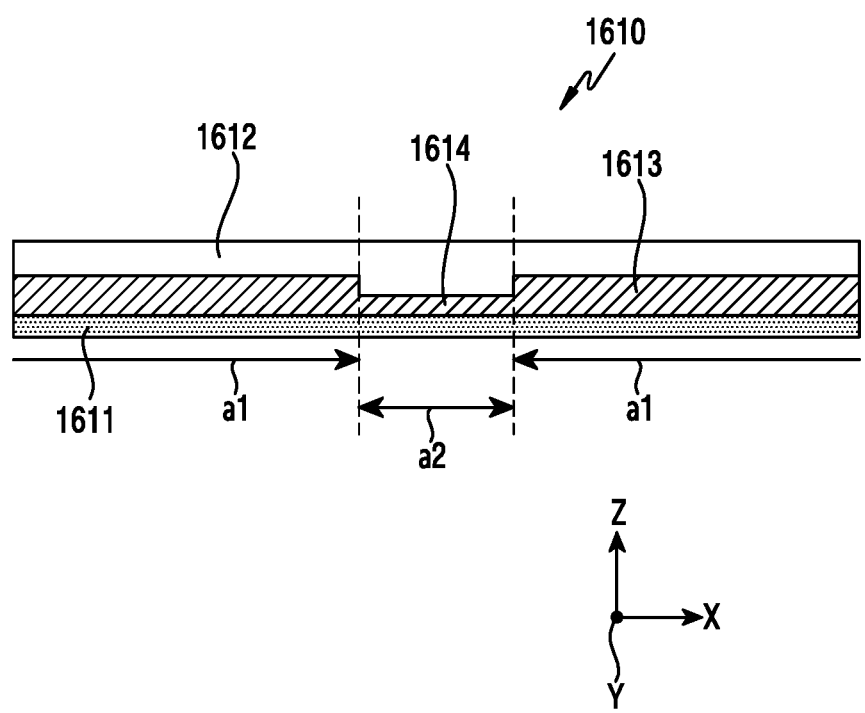
FIG. 16 is a cross-sectional view of first and second patterns provided in first and second regions of a shape variable layer according to an embodiment.

FIG. 16 is a cross-sectional view of first and second patterns provided in first and second regions of a shape variable layer, respectively, according to an embodiment.

Referring to FIG. 16, a battery cell 1610 may include an electrode layer 1612, shape variable layers 1613 and 1614 disposed on the electrode layer 1612, and an electrode active material layer 1611 disposed on the shape variable layer. For example, the shape variable layer may be configured to have a different thickness in a first region a1 and a second region a2.

A thickness (a second thickness) of the shape variable layer 1614 in the second region a2 may be configured to be thinner than a thickness (a first thickness) of the shape variable layer 1613 in the first region a1. The second region a2 may be severely stressed since it is a bending portion. Therefore, the thickness of the shape variable layer 1614 may be configured to be thinner than the shape variable layer 1613 of the first region.

Figure 17A:
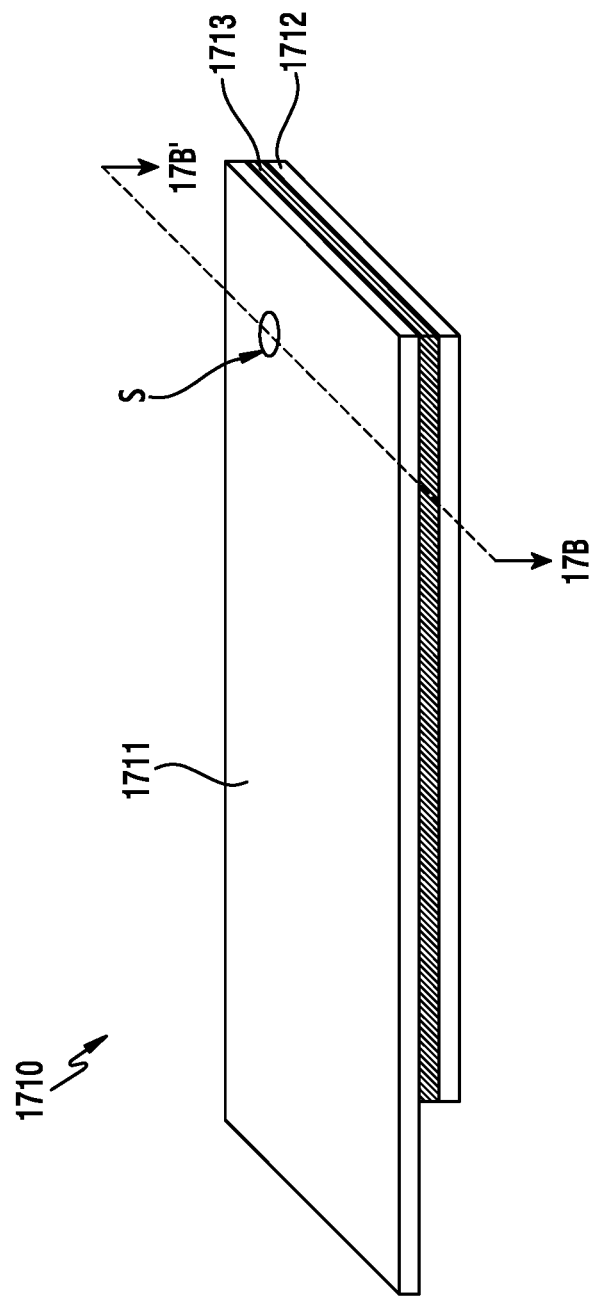
FIG. 17A is an illustration of a state where a hotspot occurs in a battery electrode assembly according to an embodiment.
Figure 17B:
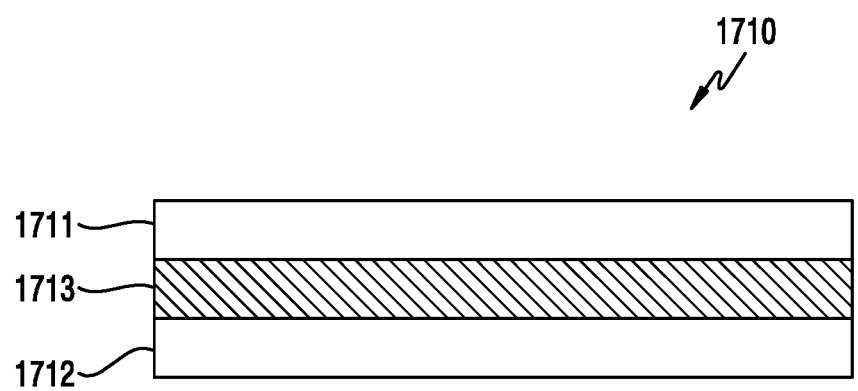
FIG. 17B is a cross-sectional view taken along line 17B-17B' in FIG. 17A.
Figure 17C:
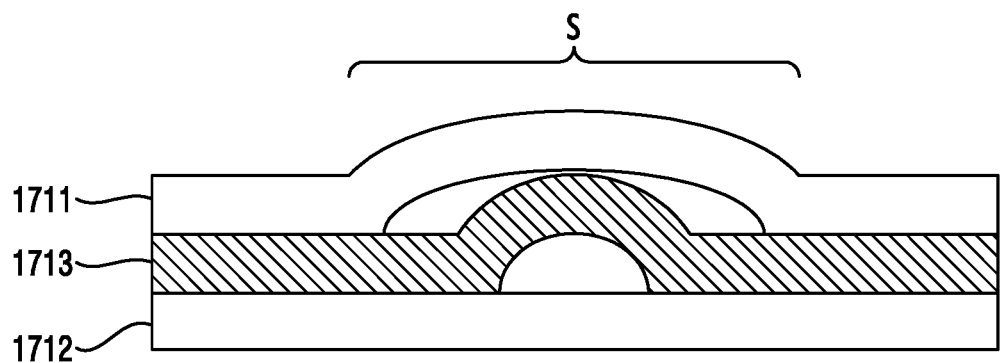
FIG. 17C is a cross-sectional view of a state where an electrode layer and an active material layer are separated in a hotspot zone according to a shape change of a shape variable layer.

FIG. 17A is an illustration of a state where a hotspot occurs in a battery electrode assembly according to various embodiments. FIG. 17B is a cross-sectional view taken along the line 17B-17B' of FIG. 17A. FIG. 17C is a cross-sectional view illustrating a state where an electrode layer and an active material layer are separated in a hotspot zone according to a shape change of a shape variable layer.

Referring to FIG. 17A to FIG. 17C, a battery cell 1710 may have a hotspot zone 's' in a portion, and only the hotspot zone 's' may be configured to be locally controllable. When the hotspot zone 's' occurs in the battery cell 1710, the shape variable layer 1713 (including the temperature control layer, for example) corresponding to the hotspot zone 's' changes shape to allow the electrode layer 1711 and electrode active material layer 1712 to be separated in a direction away from each other, thereby effectively blocking an overheating phenomenon or a thermal runaway state caused by the hotspot zone 's'.

According to an embodiment, only a portion of region may be configured as the hotspot zone in order to solve a problem caused by an increase in cost or thickness, etc., which may occur when the shape variable layer is disposed to the entire region. For example, a region in which a problem of a high temperature is likely to occur may be intensively configured as the hotspot zone. The electrode layer 1711 may be a positive electrode substrate layer or a negative electrode substrate layer, and the electrode active material layer 1712 may be a positive electrode active material layer or a negative electrode active material layer.

Figure 18A:
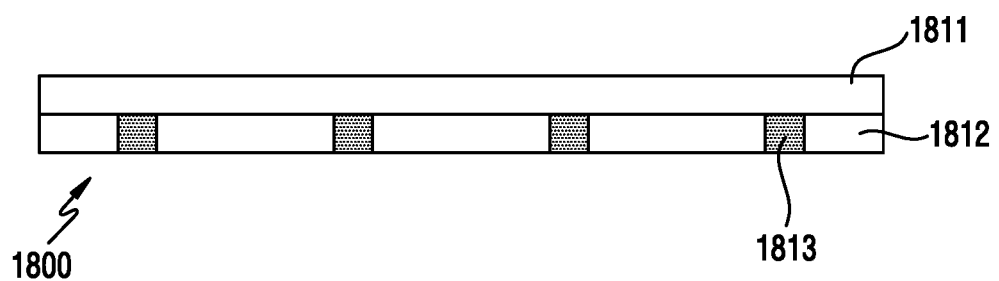
FIG. 18A is a lateral view of a state where a shape variable layer is configured as one layer in an active material layer of a battery electrode assembly according to an embodiment.
Figure 18B:
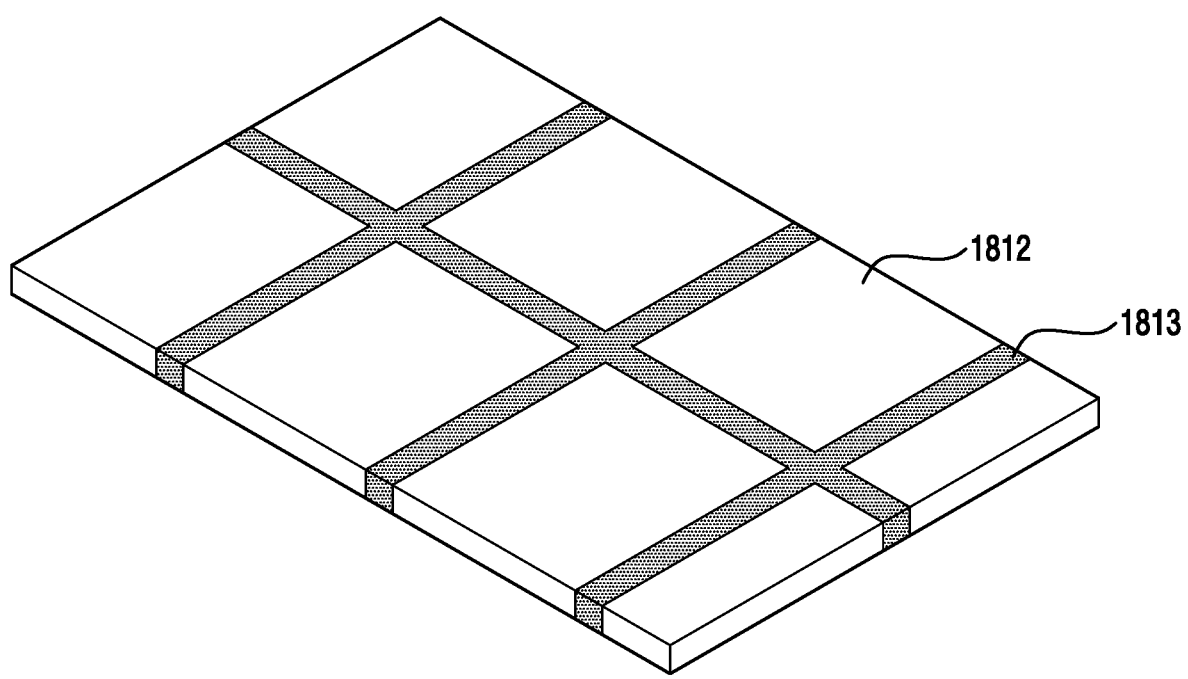
FIG. 18B is a perspective view of a state where a shape variable layer is configured as one layer in an active material layer of a battery electrode assembly according to an embodiment.

FIG. 18A is a lateral view of a state where a shape variable layer is configured as one layer in an active material layer of a battery electrode assembly according to an embodiment. FIG. 18B is a perspective view of a state where a shape variable layer is configured as one layer in an active material layer of a battery electrode assembly according to an embodiment.

Referring to FIGS. 18A and 18B, a battery electrode assembly 1800 may be configured such that a shape variable layer 1813 is included in an electrode active material layer 1812. That is, the shape variable layer 1813 and the electrode active material layer 1812 may be disposed on the same layer. For example, the electrode layer 1811 may be a positive electrode substrate layer, and the active material layer 1812 may be a positive electrode active material layer. When the electrode layer 1811 is a negative electrode substrate layer, the active material layer 1812 may be constructed of a negative electrode active material layer.

The shape variable layer 1813 according to an embodiment may be disposed to have a certain pattern in the electrode active material layer 1812. For example, the shape variable layer 1813 may be repeatedly disposed on the electrode active material layer 1812 in a rectangular array pattern.

Figure 19A:
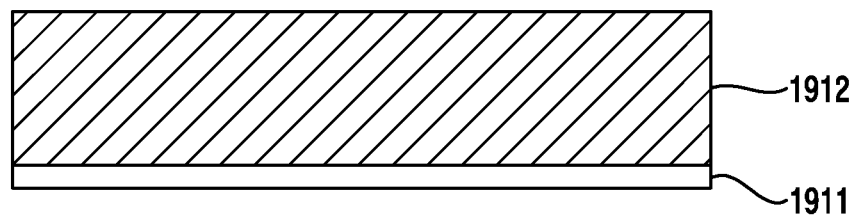
FIGS. 19AA, 19AB, and 19AC are cross-sectional views of a structure when a shape variable layer, e.g., a positive temperature coefficient (PTC) material, is absent (without PTC), when the PTC material is present in the total surface (PTC_total), and when the PTC material is present in a pattern shape (PTC_square), in an electrode structure of a battery electrode assembly according to various embodiments.
Figure 19A:
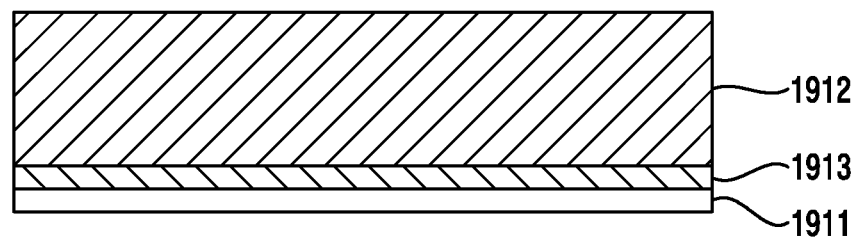
Figure 19A:
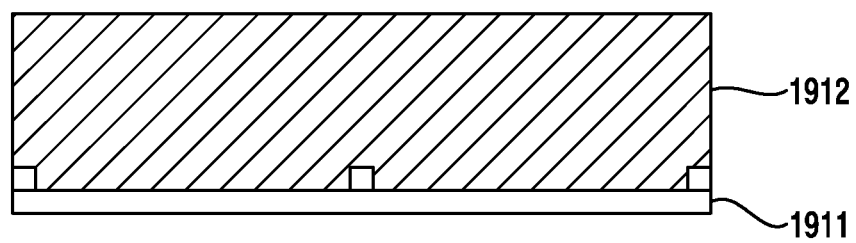

FIGS. 19AA, 19AB, and 19AC are cross-sectional views of a structure when a shape variable layer 1913, e.g., a PTC material, is absent (without PTC) FIG. 19AA), when the PTC material is present in the total surface (PTC_total) (FIG. 19AB), and when the PTC material is present in a pattern shape (PTC_square) FIG. 19AC), in an electrode structure of a battery electrode assembly according to various embodiments of the present disclosure.

Figure 19B:
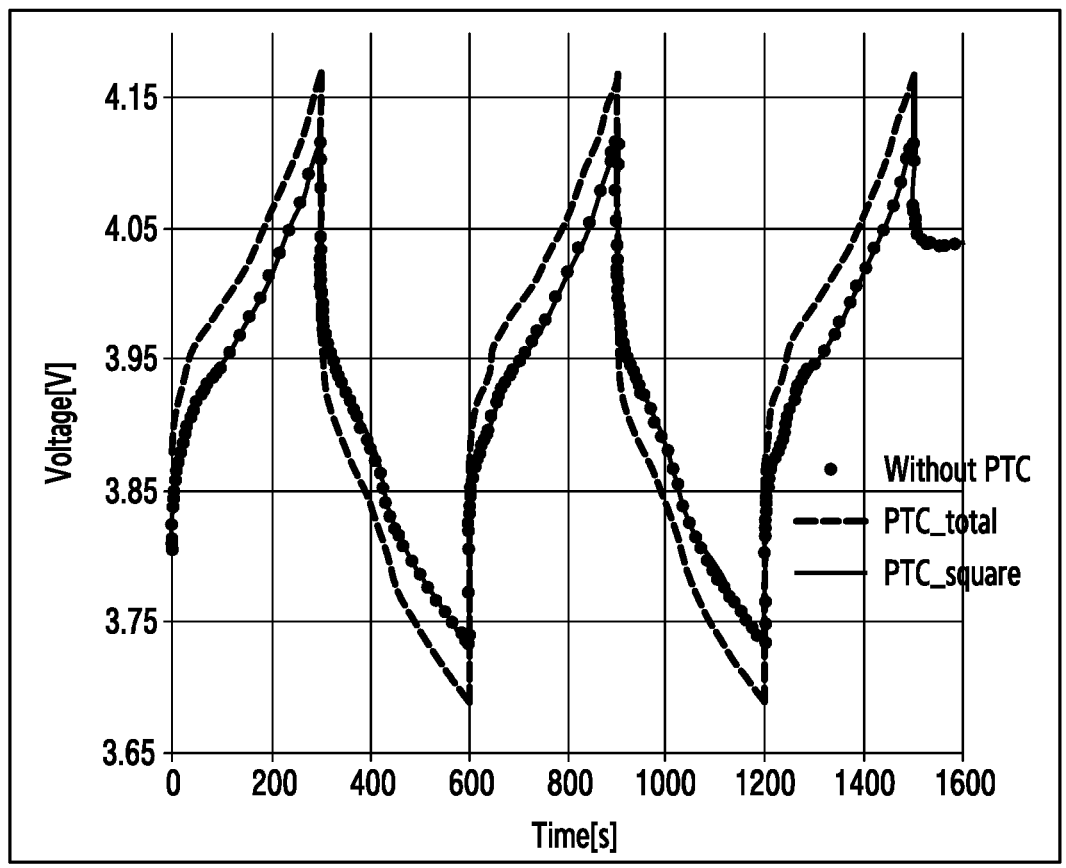
FIG. 19B is a graph of a comparison result of effects on performance of a secondary cell when a shape variable layer, e.g., a PTC material, is absent (without PTC) of FIG. 19AA, when the PTC material is present in the total surface (PTC_total) of FIG. 19AB, and when the PTC material is present in a pattern shape (PTC_square) of FIG. 19AC, in an electrode structure of a battery electrode assembly according to various embodiments.

FIG. 19B is a graph illustrating a comparison result of effects on performance of a secondary cell when the shape variable layer 1913, e.g., a PTC material, is absent (without PTC) (FIG. 19AA), when the PTC material is present in the total surface (PTC_total) (FIG. 19AB), and when the PTC material is present in a pattern shape (PTC_square) (FIG. 19AC), in an electrode structure of a battery electrode assembly according to an embodiment.

Referring to FIGS. 19AA, 19B, and 19C, a battery electrode assembly may be provided with the shape variable layer 1913 between a positive electrode substrate layer 1911 and a positive electrode active material layer 1912 (see FIG. 8A and FIG. 8B). For example, the shape variable layer 1913 may be coated on the total surface (FIG. 19AB), or may be disposed in a repetitive array shape of a certain pattern, for example, a square pattern (FIG. 19AC).

The shape variable layer according to an embodiment may be disposed between a negative electrode substrate layer and a negative electrode active material layer (see FIG. 9), or the shape variable layer may be disposed in a certain pattern having a combination structure thereof (see FIG. 10).

Hereinafter, performance of a secondary cell is compared as follows when a shape variable layer (e.g., a PTC material) is absent in a battery electrode assembly, when the shape variable layer (e.g., the PTC material) is disposed on the total surface instead of being configured in a certain pattern structure, and when the shape variable layer (e.g., the PTC material) is configured in a certain pattern, e.g., a repetitive square pattern array structure.

For example, the shape variable layer 1913 according to an embodiment is a temperature sensitive coating layer, and has a thickness of 0.015/m (10 mΩ) substantially. When the temperature sensitive coating layer is provided on the total surface, capacity and lifespan of the secondary cell may be reduced due to an increase in a voltage drop caused by resistance.

In addition, when the temperature sensitive coating layer is configured in a repetitive pattern array of a certain shape with a thickness of 0.015/m (10 mΩ) substantially, it may be equivalent to a case where the temperature sensitive coating layer is absent. For example, when the temperature sensitive coating layer is locally located, a decrease in a performance loss of the secondary cell may be minimized.

Embodiments disclosed in the present disclosure are suggested for easy explanation and understanding of the present disclosure but are not intended to limit the scope of the present disclosure. Therefore, the scope of the present disclosure, which should be interpreted as including all changes based on the various embodiments of the present disclosure or various other embodiments, is as defined in the appended claims and their equivalents.

What is claimed is:

1. A rechargeable battery, comprising:
a positive electrode substrate layer;
a positive electrode active material layer disposed adjacent to the positive electrode substrate layer;
a negative electrode substrate layer;
a negative electrode active material layer disposed adjacent to the negative electrode substrate layer;
a separator disposed between the positive electrode active material layer and the negative electrode active material layer; and
a shape variable layer disposed between the positive electrode substrate and the positive electrode active material layer or between the negative electrode substrate and the negative electrode active material layer,
wherein the rechargeable battery is a roll-type battery comprising a flat region and a bent region,
wherein the shape variable layer has a first pattern in the flat region, and has a second pattern different from the first pattern in the bent region, and
wherein a shape of a portion of the shape variable layer is changeable based at least in part on a temperature of a portion corresponding to at least a portion of the rechargeable battery.

2. The rechargeable battery of claim 1, wherein the shape variable layer is configured to regulate current between an electrode layer corresponding to the positive electrode substrate layer or the negative electrode substrate layer and an active material layer corresponding to the positive electrode active material layer or the negative electrode active material layer, based at least in part on a change of a shape of the shape variable layer.

3. The rechargeable battery of claim 1, wherein the shape variable layer comprises a first shape variable layer disposed between the positive electrode substrate layer and the positive electrode active material layer and a second shape variable layer disposed between the negative electrode substrate layer and the negative electrode active material layer.

4. The rechargeable battery of claim 1, wherein the shape variable layer comprises polynorbornene.

5. The rechargeable battery of claim 2, wherein an electrode layer corresponding to the positive electrode substrate layer or the negative electrode substrate layer is attached to a first surface of the shape variable layer, and a material layer corresponding to the positive electrode active material layer or the negative electrode active material layer is attached to a second surface facing the first surface of the shape variable layer.

6. The rechargeable battery of claim 1, wherein the shape variable layer is made of a shape memory alloy having a nano-mesh structure.

7. The rechargeable battery of claim 1, wherein in the shape variable layer, a pattern line of the first pattern is disposed with a first interval in a pre-determined direction, and a pattern line of the second pattern is disposed with a second interval in the pre-determined direction.

8. The rechargeable battery of claim 1, wherein the shape variable layer comprises a first region having a first thickness and a second region having a second thickness.

9. The rechargeable battery of claim 1, wherein the shape variable layer comprises a resistance variable layer.

10. The rechargeable battery of claim 9, wherein the resistance variable layer is made of a polymer resin which passes current in a range of a first temperature, but does not pass current in a range of a second temperature.

11. The rechargeable battery of claim 10, wherein the resistance variable layer comprises polyester, polyurethane having micro-crystallinity, and polyolefin, and as a polyolefin-based resin, comprises polyethylene (PE), polypropylene (PP), and ethylene vinyl acetate (EVA).

12. The rechargeable battery of claim 1,
wherein the electrode layer comprises a positive electrode substrate layer and a negative electrode substrate layer,
wherein the electrode active material layer comprises a positive electrode active material layer and a negative electrode active material layer, and
wherein the shape variable layer comprises a first shape variable layer disposed between the positive electrode substrate layer and the positive electrode active material layer and a second shape variable layer disposed between the negative electrode substrate layer and the negative electrode active material layer.

* * * * *